(12) United States Patent
Kii

(10) Patent No.: US 9,047,046 B2
(45) Date of Patent: Jun. 2, 2015

(54) INFORMATION PROCESSING APPARATUS, INFORMATION PROCESSING METHOD AND PROGRAM

(75) Inventor: Manabu Kii, Tokyo (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 12/754,832

(22) Filed: Apr. 6, 2010

(65) Prior Publication Data

US 2011/0018821 A1 Jan. 27, 2011

(30) Foreign Application Priority Data

Apr. 14, 2009 (JP) ................................. 2009-097724

(51) Int. Cl.
| G06F 3/041 | (2006.01) |
| G06F 1/16 | (2006.01) |
| G06F 3/0488 | (2013.01) |

(52) U.S. Cl.
CPC .......... *G06F 1/1616* (2013.01); *G06F 3/04883* (2013.01)

(58) Field of Classification Search
None
See application file for complete search history.

(56) References Cited

U.S. PATENT DOCUMENTS

| 6,331,840 | B1 | 12/2001 | Nielson et al. |
| 6,459,419 | B1 * | 10/2002 | Matsubayashi ............... 345/156 |
| 6,545,669 | B1 * | 4/2003 | Kinawi et al. ................ 345/173 |
| 7,676,767 | B2 * | 3/2010 | Hofmeister et al. .......... 715/863 |
| 2006/0101354 | A1 | 5/2006 | Hashimoto et al. |
| 2007/0242771 | A1 | 10/2007 | Kondo |
| 2008/0178090 | A1 * | 7/2008 | Mahajan et al. ............... 715/733 |
| 2008/0211766 | A1 * | 9/2008 | Westerman et al. ........... 345/156 |
| 2008/0231610 | A1 * | 9/2008 | Hotelling et al. ............. 345/173 |
| 2009/0051671 | A1 * | 2/2009 | Konstas ......................... 345/174 |
| 2009/0079704 | A1 * | 3/2009 | Huang et al. .................. 345/173 |
| 2009/0267903 | A1 * | 10/2009 | Cady et al. .................... 345/173 |
| 2009/0322689 | A1 * | 12/2009 | Kwong et al. ................. 345/173 |
| 2011/0209100 | A1 * | 8/2011 | Hinckley et al. .............. 715/863 |

FOREIGN PATENT DOCUMENTS

| EP | 1 775 925 A2 | 4/2007 |
| EP | 1 775 925 A3 | 4/2007 |
| JP | 6-44001 | 2/1994 |
| JP | 2003-150273 | 5/2003 |
| JP | 2007-193589 | 8/2007 |

OTHER PUBLICATIONS

U.S. Appl. No. 12/708,099, filed Feb. 18, 2010, Kii.
Office Action issued Dec. 11, 2012, in Japanese Patent Application No. 2009-097724.
European Office Action Issued Apr. 11, 2013 in Patent Application No. 10 003 748.0.

* cited by examiner

*Primary Examiner* — Nicholas Lee
*Assistant Examiner* — Duane N Taylor, Jr.
(74) *Attorney, Agent, or Firm* — Oblon, McClelland, Maier & Neustadt, L.L.P.

(57) ABSTRACT

An information processing apparatus includes a first touch panel, a second touch panel, and a controller. The first touch panel displays a first object and detects a first touch operation of a user on the first object. The second touch panel displays a second object and detects a second touch operation of the user on the second object. The controller links and changes the displayed first object and the displayed second object when the second touch operation is detected within a predetermined time period since the first touch operation has been detected.

14 Claims, 15 Drawing Sheets

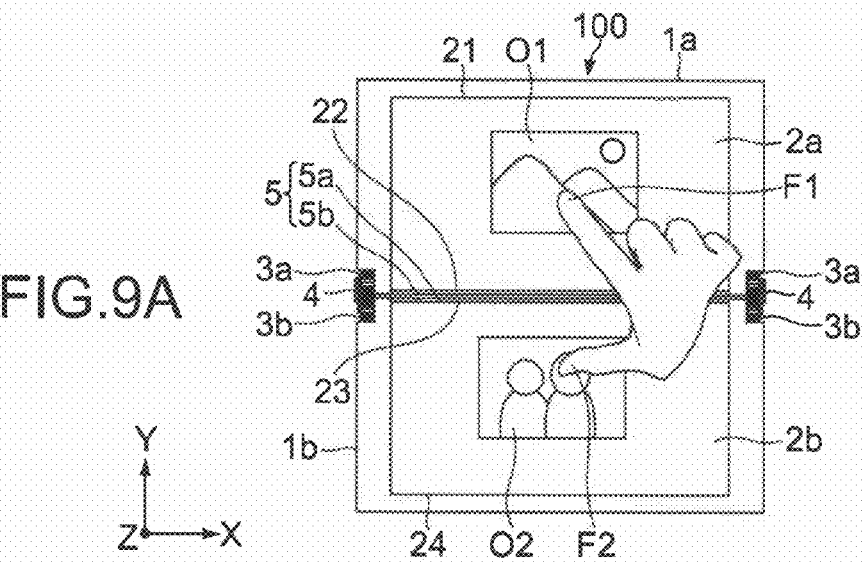
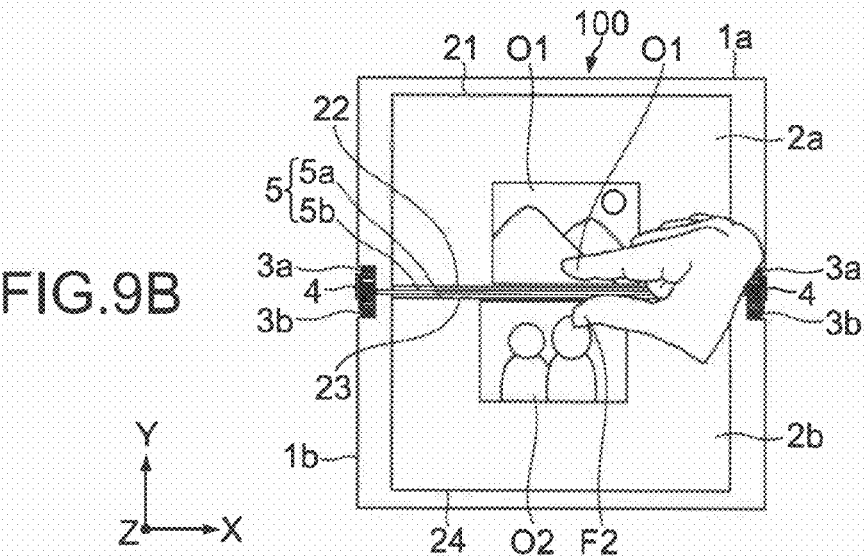
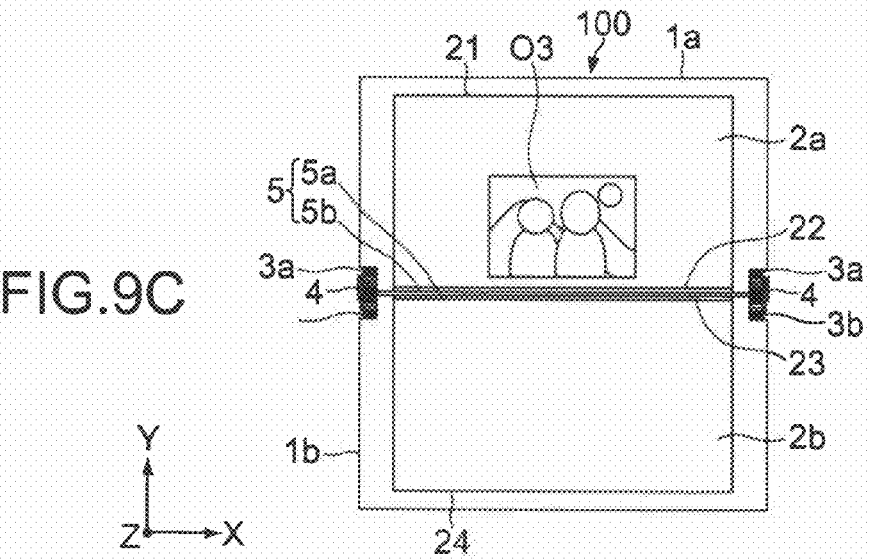

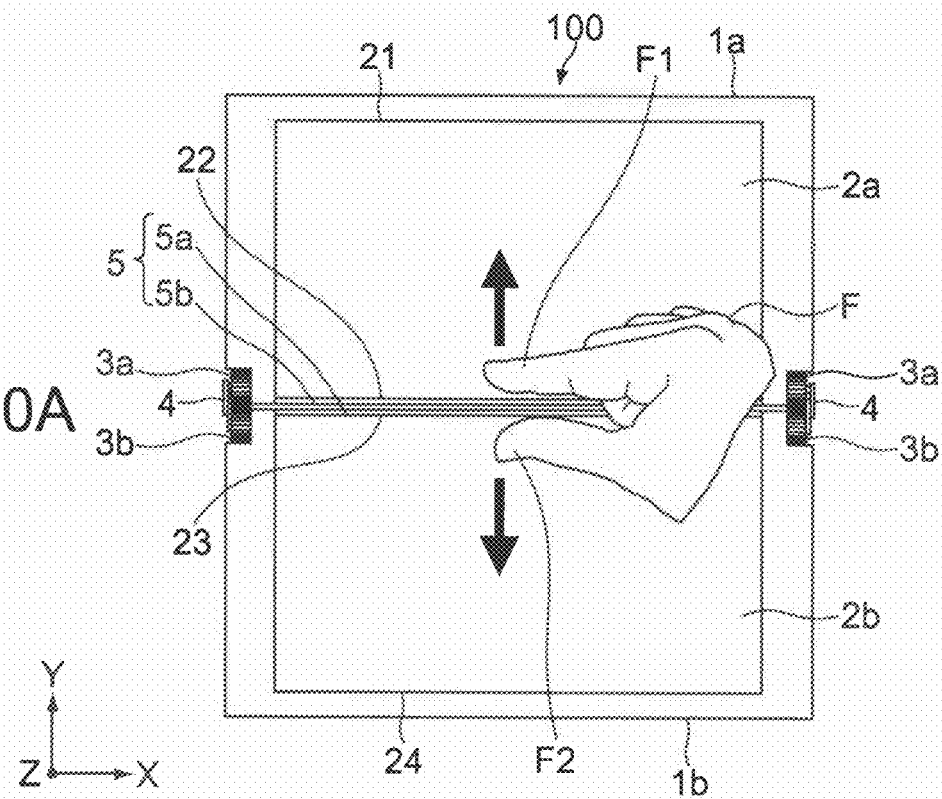
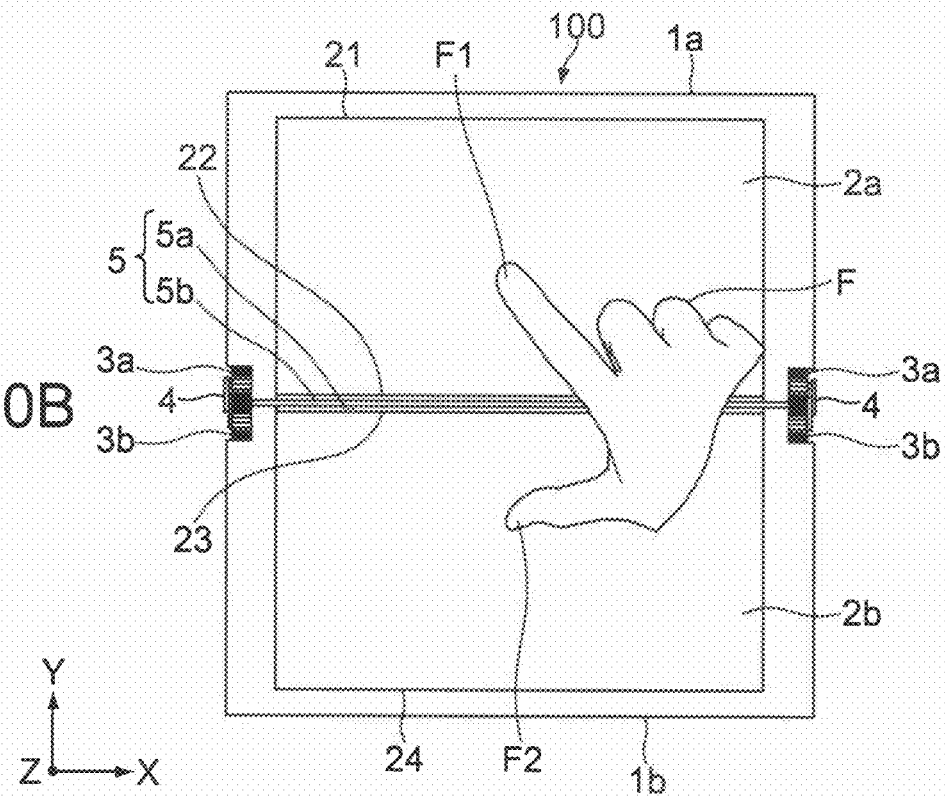

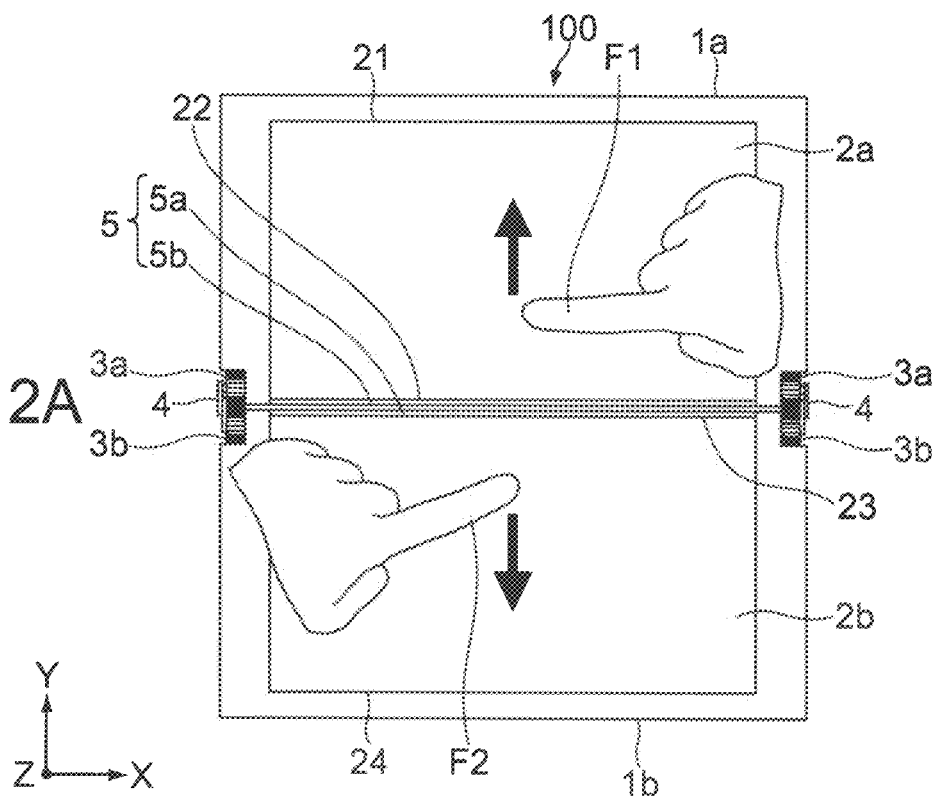
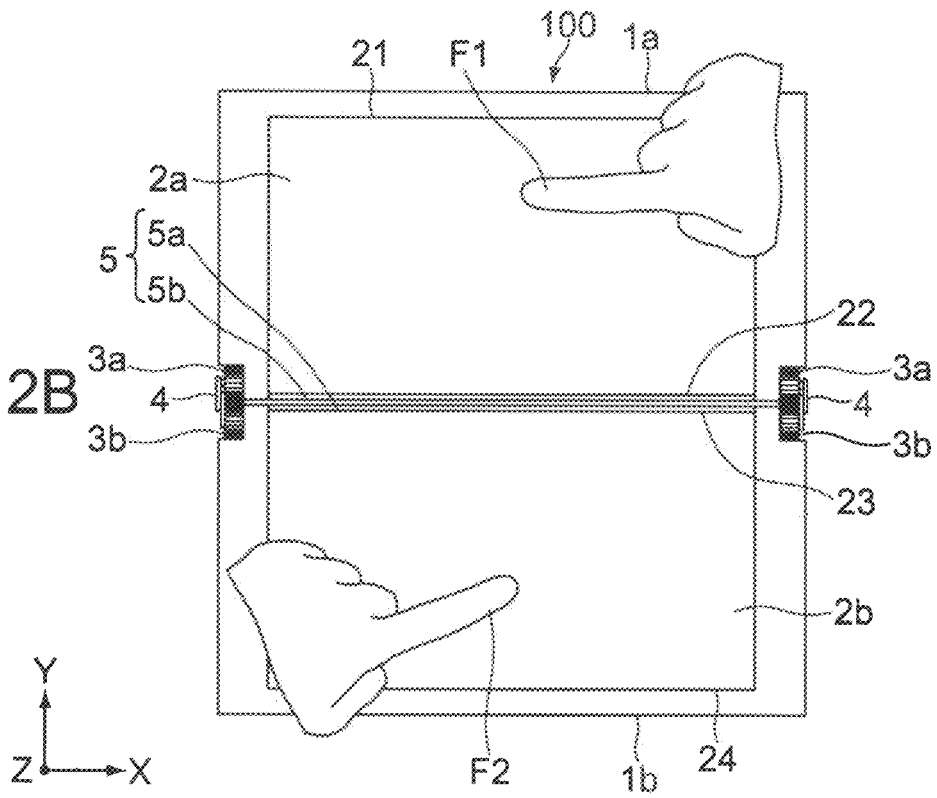

INFORMATION PROCESSING APPARATUS, INFORMATION PROCESSING METHOD AND PROGRAM

BACKGROUND OF THE INVENTION

1. Field of the Invention

The present invention relates to an information processing apparatus including a plurality of touch panels, an information processing method for the information processing apparatus, and a program therefor.

2. Description of the Related Art

From the past, information processing apparatuses that each include a plurality of touch panels are known. For example, Japanese Patent Application Laid-open No. 2003-150273 (FIGS. 1, 4, 10, etc.; hereinafter, referred to as Patent Document 1) discloses a watch-type PDA (Personal Digital Assistant) in which a plurality of panels including LCDs (Liquid Crystal Displays) integrally formed with a plurality of touch panels are connected by a hinge portion.

SUMMARY OF THE INVENTION

However, in the PDA disclosed in Patent Document 1, only an operation to a button displayed on each LCD is detected by the touch panel. Accordingly, when touch operations to a plurality of touch panels are detected, the PDA is incapable of linking and controlling display of respective objects as operation targets between the plurality of touch panels. That is, the PDA is incapable of executing single, integrated processing on the plurality of touch panels.

In view of the circumstances as described above, there is a need for an information processing apparatus, an information processing method, and a program therefor that are capable of linking and controlling display of respective objects as operation targets between a plurality of touch panels in accordance with touch operations detected on the plurality of touch panels, and executing single, integrated processing.

According to an embodiment of the present invention, there is provided an information processing apparatus including a first touch panel, a second touch panel, and a controller. The first touch panel displays a first object and detects a first touch operation of a user on the first object. The second touch panel displays a second object and detects a second touch operation of the user on the second object. The controller links and changes the displayed first object and the displayed second object when the second touch operation is detected within a predetermined time period since the first touch operation has been detected.

With this structure, the information processing apparatus can link and control display of the objects as operation targets between the respective touch panels, in accordance with the touch operations detected by the first and second touch panels, and thus execute single, integrated processing. Accordingly, since the information processing apparatus can process a plurality of objects not only individually but also integrally, as compared to a case where a single touch panel is used, it is possible to increase flexibility of processing in accordance with uses by a user.

Here, the predetermined time period is, for example, about 0 to 3 seconds, but not limited thereto. In other words, the predetermined time period also includes a case where the first touch operation and the second touch operation are detected at the same time. The first and second touch panels include those that include a non-contact-type capacitance sensor, and the first and second touch operations include those that are not accompanied by a physical contact with respect to the first and second touch panels. Further, the first and second objects include an icon, a window, the entire screen, and various other images, for example. The first and second objects may be an object obtained by dividing a single object on the first touch panel and the second touch panel and displayed, or may be separately and individually displayed.

The first touch operation and the second touch operation may be operations in opposite directions.

Accordingly, by setting the touch operations for linking and changing the first and second objects to be in the directions opposite to each other, the information processing apparatus causes the user to easily recognize a difference with a normal, non-linking touch operation and intuitionally input the touch operation. As a result, the information processing apparatus can also prevent an erroneous operation of the user. Here, the directions opposite to each other include operations not only in a linear direction but also in a curved direction and a rotation direction.

The controller may display the first object on the second touch panel and display the second object on the first touch panel when the second touch operation is detected within the predetermined time period since the first touch operation has been detected.

Accordingly, the user can switch display of objects or screens displayed on the first and second touch panels by intuitional touch operations.

Each of the first object and the second object may be displayed as a part of a single third object. In this case, each of the first touch operation and the second touch operation may be an operation in a rotation direction. In this case, the controller may rotate the third object when the second touch operation is detected within the predetermined time period since the first touch operation has been detected.

Accordingly, the user can not only view one object on a plurality of touch panels but also rotate the object by easy and intuitional operations that are similar to an operation of rotating an actual object.

Each of the first object and the second object may be displayed as a part of a single third object. In this case, the first touch operation and the second touch operation may be operations in directions moving away from each other. In this case, the controller may change the third object so that the third object is torn when the second touch operation is detected within the predetermined time period since the first touch operation has been detected.

Accordingly, the user can not only view one object on a plurality of touch panels but also change the object by easy and intuitional operations that are similar to an operation of tearing an actual document or the like.

In this case, the information processing apparatus may further include a storage to store data corresponding to the third object, and the controller may delete the data from the storage when the third object is changed so that the third object is torn.

Accordingly, the user can intuitionally execute delete processing of the data corresponding to the third object by seeing the delete processing as an operation of tearing the third object.

The first touch operation and the second touch operation may be operations in directions moving close to each other. In this case, the controller may change the first object and the second object so that the first object and the second object are integrated into one when the second touch operation is detected within the predetermined time period since the first touch operation has been detected.

Accordingly, the user can integrate the objects displayed on the first and second touch panels into one by easy and intuitional operations that are similar to an operation of bring actual objects close to each other and collecting them.

The information processing apparatus may further include a sensor to detect a thing that is present at a predetermined distance from the first touch panel and the second touch panel. In this case, the controller may link and change the displayed first object and the displayed second object when the second touch operation is detected within the predetermined time period since the first touch operation has been detected and the thing is detected by the sensor.

In this case, the thing that is present at the predetermined distance is, for example, a hand of the user, more specifically, a base portion between two fingers.

Accordingly, for example, in a case where the first touch operation is input with a finger of a hand of the user and the second touch operation is input with another finger of the hand, the information processing apparatus can reliably recognize that the touch operations are input with the two fingers by detecting the hand with the sensor. Accordingly, even in a case where only the first touch operation is input and other thing is in contact with the second touch panel by coincidence, the information processing apparatus can prevent a false detection and false change of display due to the contact of the other thing. This is because in such a case, the thing itself is detected by the sensor but detected at a distance smaller than the predetermined distance.

Further, in this case, the controller may change the displayed first object and the displayed second object in a first mode when the thing is detected by the sensor, and change the displayed first object and the displayed second object in a second mode that is different from the first mode, when the thing is not detected by the sensor.

Accordingly, in accordance with the presence of the detection of the thing by the sensor, the information processing apparatus can change the first and second objects in different modes even in a case where the same first and second operations are detected. Thus, the information processing apparatus can execute processing of more patterns in accordance with the first and second touch operations and increase user-friendliness.

The information processing apparatus may further include a storage to store first data corresponding to the first object and second data corresponding to the second object. In this case, the first touch operation may be an operation of enclosing the first object in a predetermined rotation direction, and the second touch operation may be the operation of enclosing the second object in the predetermined rotation direction. In this case, the controller may cause the storage to group and store the first data and the second data when the second touch operation is detected within the predetermined time period since the first touch operation has been detected.

Accordingly, the user can group and store the first and second data corresponding to the first and second objects by only performing easy and intuitional operations of enclosing the first and second objects.

According to another embodiment of the present invention, there is provided an information processing method including displaying, by a first touch panel, a first object and detecting a first touch operation of a user on the first object. Further, the information processing method includes displaying, by a second touch panel, a second object and detecting a second touch operation of the user on the second object. When the second touch operation is detected within a predetermined time period since the first touch operation has been detected, the displayed first object and the displayed second object are linked and changed.

According to a still another embodiment of the present invention, there is provided a program causing an information processing apparatus including a first touch panel and a second touch panel to execute a first detection step, a second detection step, and a display control step. The first detection step includes displaying, by the first touch panel, a first object and detecting a first touch operation of a user on the first object. The second detection step includes displaying, by the second touch panel, a second object and detecting a second touch operation of the user on the second object. The display control step includes linking and changing the displayed first object and the displayed second object when the second touch operation is detected within a predetermined time period since the first touch operation has been detected.

As described above, according to the embodiments of the present invention, it is possible to execute single, integrated processing by linking and controlling display of objects as operation targets between the plurality of touch panels in accordance with touch operations detected on the plurality of touch panels.

These and other objects, features and advantages of the present invention will become more apparent in light of the following detailed description of best mode embodiments thereof, as illustrated in the accompanying drawings.

BRIEF DESCRIPTION OF DRAWINGS

FIG. 9 are diagrams showing an example of the specific display processing corresponding to the pinch gesture shown in FIG. 8;

FIG. 10 are diagrams showing an example of a state of a zoom-in gesture in the portable information apparatus according to the embodiment of the present invention seen from the direction of the plane of the touch panel;

FIG. 12 are diagrams showing an example of a state of a tear gesture in the portable information apparatus according to the embodiment of the present invention seen from the direction of the plane of the touch panel;

DESCRIPTION OF PREFERRED EMBODIMENTS

Hereinafter, an embodiment of the present invention will be described with reference to the drawings.

(General Outline of Portable Information Apparatus)

Figure 1:
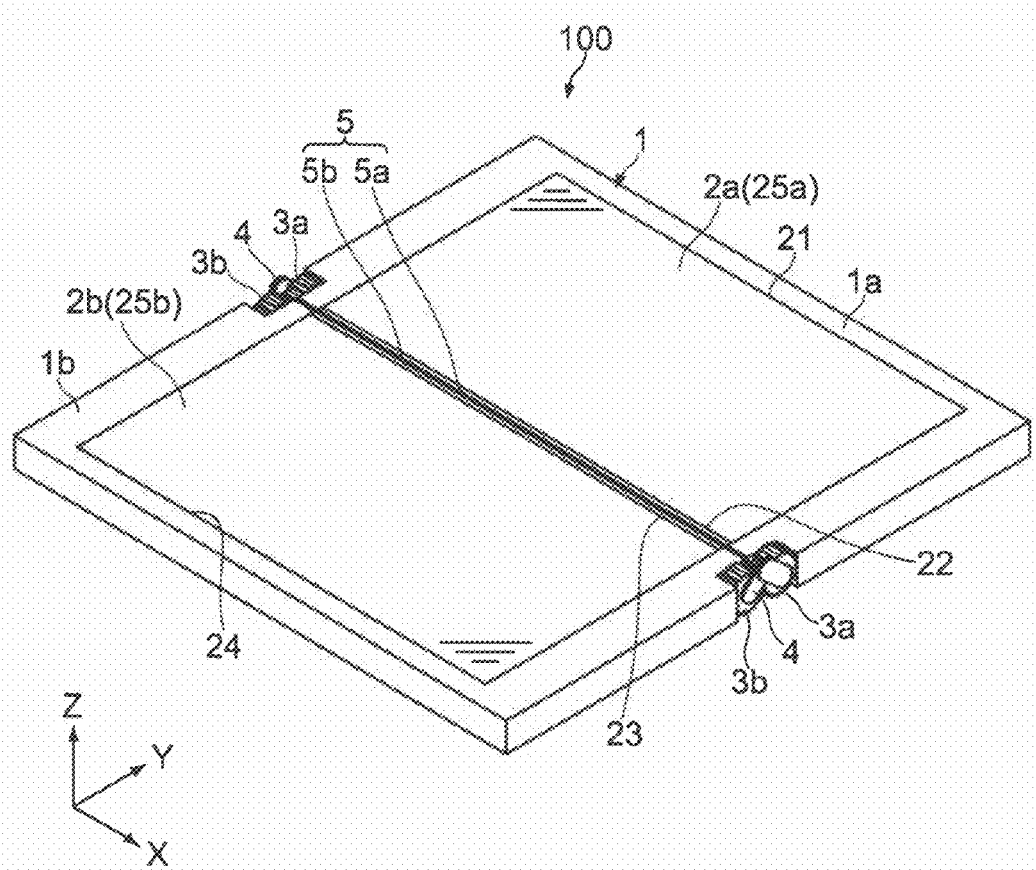
FIG. 1 is a diagram showing an outer appearance of a portable information apparatus according to an embodiment of the present invention.

FIG. 1 is a diagram showing an outer appearance of a portable information apparatus according to the embodiment of the present invention.

As shown in the figure, a portable information apparatus 100 includes a so-called clamshell-type casing 1 in which two casings 1a and 1b are connected rotatably (in openable state). FIG. 1 shows a state where the casings 1a and 1b are opened. A user operates the portable information apparatus 100 in this state.

The casings 1a and 1b include touch panels 2a and 2b, respectively, on surfaces thereof that are exposed in the opened state. The touch panels 2a and 2b are provided integrally with displays 25a and 25b, respectively. The touch panel 2a includes a touch surface having an end side 21 and an end side 22 opposed to the end side 21. Similarly, the touch panel 2b includes a touch surface having an end side 23 and an end side 24 opposed to the end side 23. The touch panels 2a and 2b detect touch operations made by a finger of a user on an object displayed on the displays 25a and 25b. The user inputs touch operations using two fingers of one hand (typically, thumb and forefinger) or a finger of one hand and a finger of the other hand (typically, forefingers). Typically, the touch operation includes an operation of dragging a finger in an arbitrary direction (operation of running a finger across touch panels 2a and 2b) or a click (simple touch) operation, but not limited thereto.

The casing 1a includes gear members 3a on both side surfaces on the end side 22 side, and the casing 1b includes gear members 3b on both side surfaces on the end side 23 side. The gear members 3a and the gear members 3b are connected in an intermeshed state by coupling members 4. The coupling members 4 are each structured such that ends of two plates (or bars) are connected rotatably, and the other ends of the two plates (or bars) are connected to rotary axes of the gear members 3a and 3b. By the gear members 3a and 3b and the coupling members 4, the casings 1a and 1b are connected rotatably. With such a structure, a distance between the touch panel 2a of the casing 1a and the touch panel 2b of the casing 1b can be brought closer to each other than in a case where the casings 1a and 1b are connected using, for example, a hinge.

An optical sensor 5 is provided between the end side 22 of the touch panel 2a and the end side 23 of the touch panel 2b. The optical sensor 5 includes an optical sensor portion 5a that is provided continuously on the casing 1a from the end side 22 of the touch panel 2a and an optical sensor portion 5b that is provided continuously on the casing 1b from the end side 23 of the touch panel 2b. The touch surface of the touch panel 2a, the touch surface of the touch panel 2b, and a surface of the optical sensor 5 are provided so as to be positioned on the same plane when the casings 1a and 1b are in the opened state.

(Hardware Structure of Portable Information Apparatus)

Figure 2:
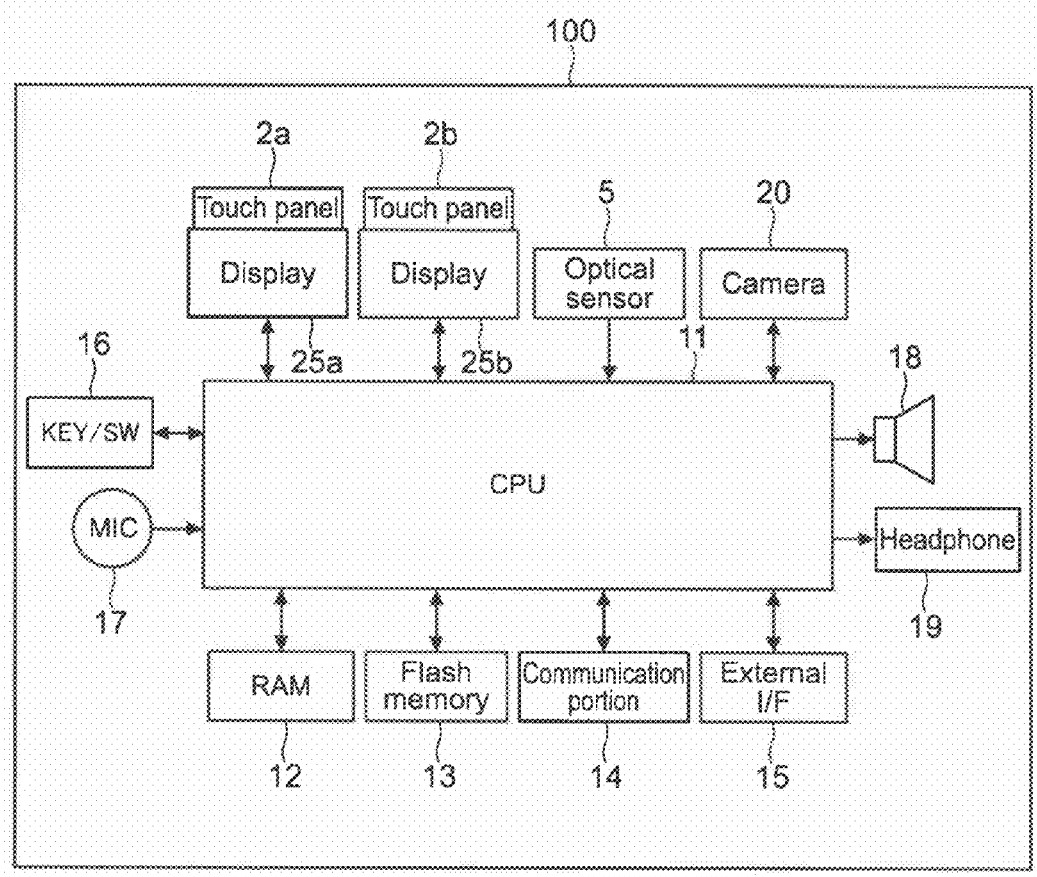
FIG. 2 is a diagram showing a hardware structure of the portable information apparatus according to the embodiment of the present invention.

FIG. 2 is a diagram showing a hardware structure of the portable information apparatus 100.

As shown in the figure, the portable information apparatus 100 includes, in addition to the touch panels 2a and 2b (displays 25a and 25b) and the optical sensor 5, a CPU (Central Processing Unit) 11, a RAM (Random Access Memory) 12, and a flash memory 13. The portable information apparatus 100 also includes a communication portion 14, an external I/F (Interface) 15, a key/switch portion 16, a microphone 17, a speaker 18, a headphone 19, and a camera 20.

The CPU 11 exchanges signals with the respective portions of the portable information apparatus 100 to perform various operations and collectively controls various types of display control (display change) processing and other processing that correspond to touch operations (touch gestures) made to the touch panels 2a and 2b.

The RAM 12 is used as a working area of the CPU 11 and temporarily stores various types of data including various GUIs (objects) to be processed by the CPU 11 and programs such as an application for executing various types of display processing corresponding to the touch operations to the touch panels 2a and 2b.

The flash memory 13 is of a NAND type, for example. The flash memory 13 stores various types of data including images such as various icons and various programs such as a control program to be executed by the CPU 11 and an application for executing the various types of display processing. The application may be stored in other recording media such as a memory card (not shown). The portable information apparatus 100 may include an HDD in place of or in addition to the flash memory 13.

The communication portion 14 is an interface for connecting the portable information apparatus 100 to the Internet or a LAN (Local Area Network) according to a standard of the Ethernet (registered trademark), a wireless LAN, and the like.

The external I/F 15 exchanges various types of data via wired or wireless connection with an external apparatus based on various standards of a USB (Universal Serial Bus), a wireless LAN, and the like. The external I/F 15 may alternatively be an interface for connecting to various memory cards such as a memory stick.

The key/switch portion 16 accepts operations corresponding to functions equivalent to functions that cannot be executed by an operation to the touch panels 2a and 2b, such as ON/OFF of a power source (not shown) and a switch of various functions, and functions that can be executed by an operation to the touch panels 2a and 2b, and transmits input signals to the CPU 11.

The microphone 17 inputs audio such as a user voice for verbal communication in a case where the portable information apparatus 100 is connected to other apparatuses on a network by the communication portion 14.

The speaker 18 and the headphone 19 output audio signals that are stored in the flash memory 13 or the like or input from the communication portion 14 or the microphone 17.

The camera 20 captures a still image and a moving image by an image pickup device such as a CMOS (Complementary Metal Oxide Semiconductor) sensor and a CCD (Charge Coupled Device) sensor. The captured data is stored in the RAM 12 or the flash memory 13 or transmitted to other apparatuses on the network via the communication portion 14.

Although a resistance film system or a capacitance system is used as an operation system of the touch panels 2a and 2b, other systems such as an electromagnetic induction system, a matrix switch system, a surface elastic wave system, and an infrared-ray system may be used instead. When the capacitance system is used as the operation system, the "touch operation" in this embodiment includes not only a case where a finger of a user is physically in contact with the touch panels 2a and 2b, but also a case where the finger of the user is brought close enough within a range in which a change in a capacitance can be detected.

The optical sensor 5 is of a reflection type, for example, and includes a light emitting device such as an LED (Light Emitting Diode) that emits infrared light and a light receiving device such as a photodiode and a phototransistor. The optical sensor 5 detects whether a thing is present within a predetermined distance range above the optical sensor 5. In this embodiment, the optical sensor 5 detects whether (a finger of) a hand of a user is present within the predetermined distance range above the optical sensor 5. That is, the optical sensor 5 detects whether the hand of the user is present above the optical sensor 5 such that two fingers of the user are across the touch panels 2a and 2b. In this case, the predetermined distance range is, for example, about 3 cm to 15 cm, but is not limited thereto.

In a case where the touch operations to the touch panels 2a and 2b are detected and a thing is present within the predetermined distance range, it is judged that the user is performing the touch operations with two fingers. For example, in a case where the user is performing the touch operations to the touch panels 2a and 2b with a thumb and a forefinger, a base portion between the thumb and the forefinger is detected by the optical sensor 5. On the other hand, in a case where the touch operations are detected but no thing is detected within the predetermined distance range by the optical sensor 5, it is judged that the user touches the touch panel 2a with a finger of one hand and touches the touch panel 2b with a finger of the other hand.

Though not shown, the portable information apparatus 100 also includes a cable and a flexible substrate for an electrical connection between the touch panels 2a and 2b. The cable and the flexible substrate may be provided across the gear members 3a and 3b and the coupling members 4.

The displays 25a and 25b are, for example, an LCD of a TFT (Thin Film Transistor) or the like or an OELD (Organic Electro-Luminescence Display) and display GUIs for touch operations such as an icon, a window, and the entire screen, and other images. The displays 25a and 25b are integrally formed with the touch panels 2a and 2b as described above.

(Operation of Portable Information Apparatus)

Next, an operation of the portable information apparatus 100 structured as described above will be described.

(Opening and Closing Operation of Portable Information Apparatus)

First, an opening and closing operation of the portable information apparatus 100 will be described. FIG. 3 are diagrams showing opening and closing states of the portable information apparatus 100.

Figure 3A:
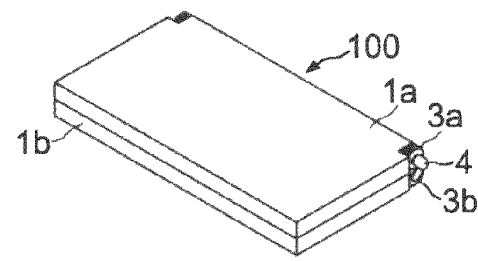
FIG. 3 are diagrams showing opening and closing states of the portable information apparatus according to the embodiment of the present invention.
Figure 3B:
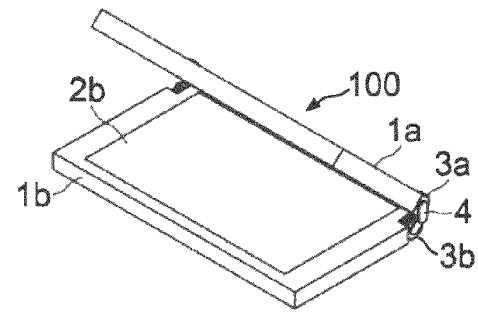
Figure 3C:
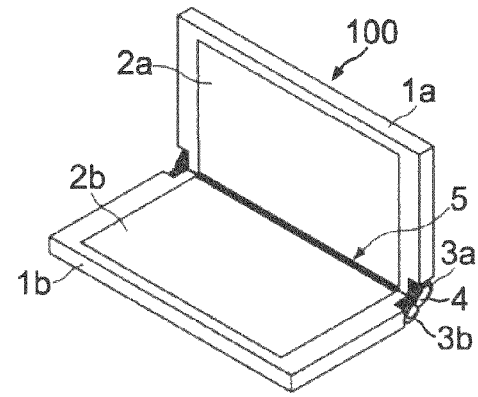
Figure 3D:
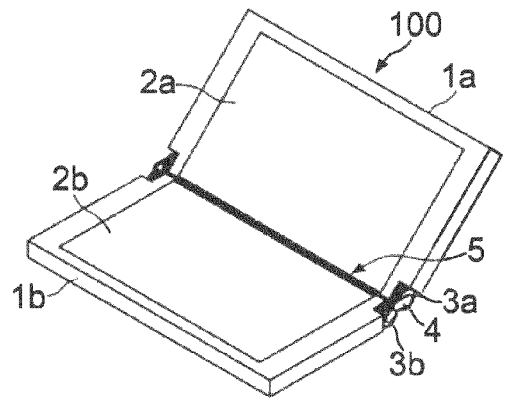
Figure 3E:
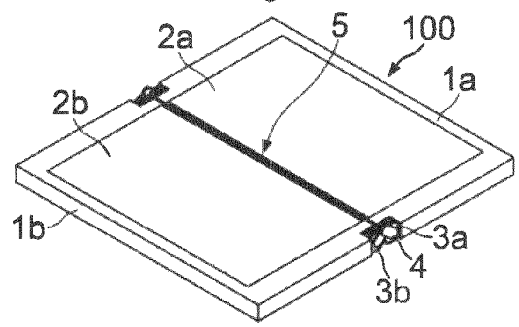

As shown in FIG. 3A, when the user lifts up the casing 1a in a state where the casings 1a and 1b are closed, for example, the gear members 3a and 3b and the coupling members 4 rotate to open the casing 1a as shown in FIGS. 3B to 3D. Accordingly, the touch panels 2a and 2b are exposed. Then, as shown in FIG. 3E, the casings 1a and 1b become static when opened 180 degrees so that the touch surfaces of the touch panels 2a and 2b and the optical sensor 5 are positioned on the same plane. The touch operation of the user is input in the state shown in FIG. 3E. By thus setting the touch surfaces on the same plane, it becomes possible for the user to perform intuitional operations without being bothered by the different touch panels and the optical sensor between both the touch panels.

(Object Display Control Processing of Portable Information Apparatus)

Next, display control processing in which objects corresponding to touch operations (touch gestures) detected by the touch panels 2a and 2b of the portable information apparatus 100 are linked will be described. In the following description, the CPU 11 is described as an agent of operations, but the operations of the CPU 11 are executed in cooperation with a program developed in the RAM 12.

Figure 4:
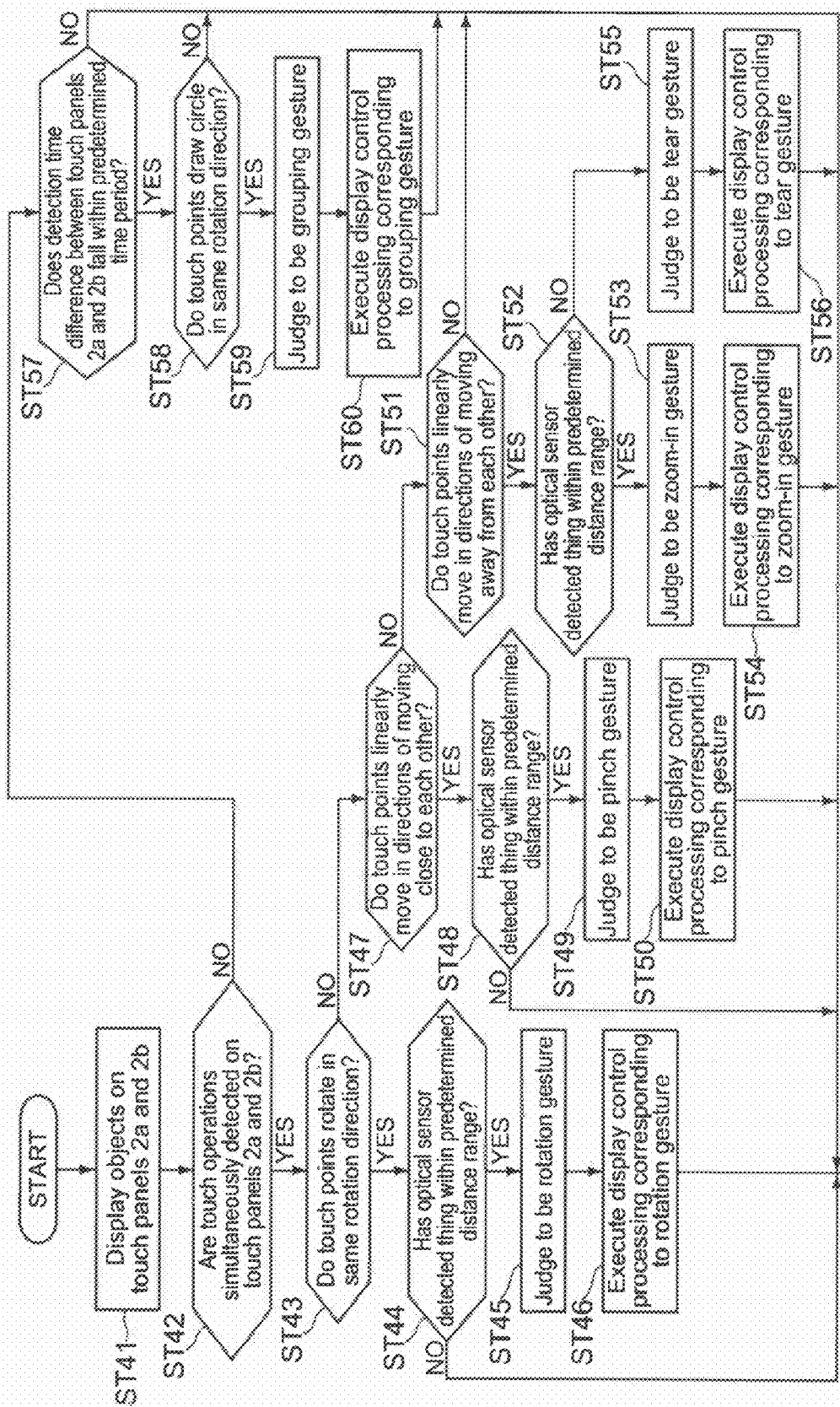
FIG. 4 is a flowchart showing a flow of processing in accordance with a touch operation by the portable information apparatus according to the embodiment of the present invention.

FIG. 4 is a flowchart showing a flow of the object display control processing by the portable information apparatus 100.

As shown in the figure, first, the CPU 11 displays objects on the touch panels 2a and 2b (Step 41). Subsequently, the CPU 11 detects whether touch operations to the objects are detected on the touch panels 2a and 2b at the same time (Step 42). In this case, "the same time" may not indicate the same time in a strict sense and includes a case where each of the touch operations is detected within 0.5 seconds, for example.

In the case where the touch operations are detected at the same time (YES), the CPU 11 judges whether touch points of the detected touch operations rotate in the same rotation direction (Step 43). When judging that the touch points rotate in the same rotation direction (YES), the CPU 11 judges whether the optical sensor 5 detects a thing (hand) within the predetermined distance range (Step 44). In a case where a thing (hand) is not detected within the predetermined distance range (NO), the CPU 11 judges the detected touch operations are a false detection, and ends the link display control processing of objects.

In a case where a thing (hand) is detected within the predetermined distance range (YES), the CPU 11 judges that the touch operations are a rotation gesture (Step 45).

FIG. 5 are diagrams showing an example of a state of the rotation gesture seen from a direction of a plane of the touch panels 2a and 2b.

Figure 5A:
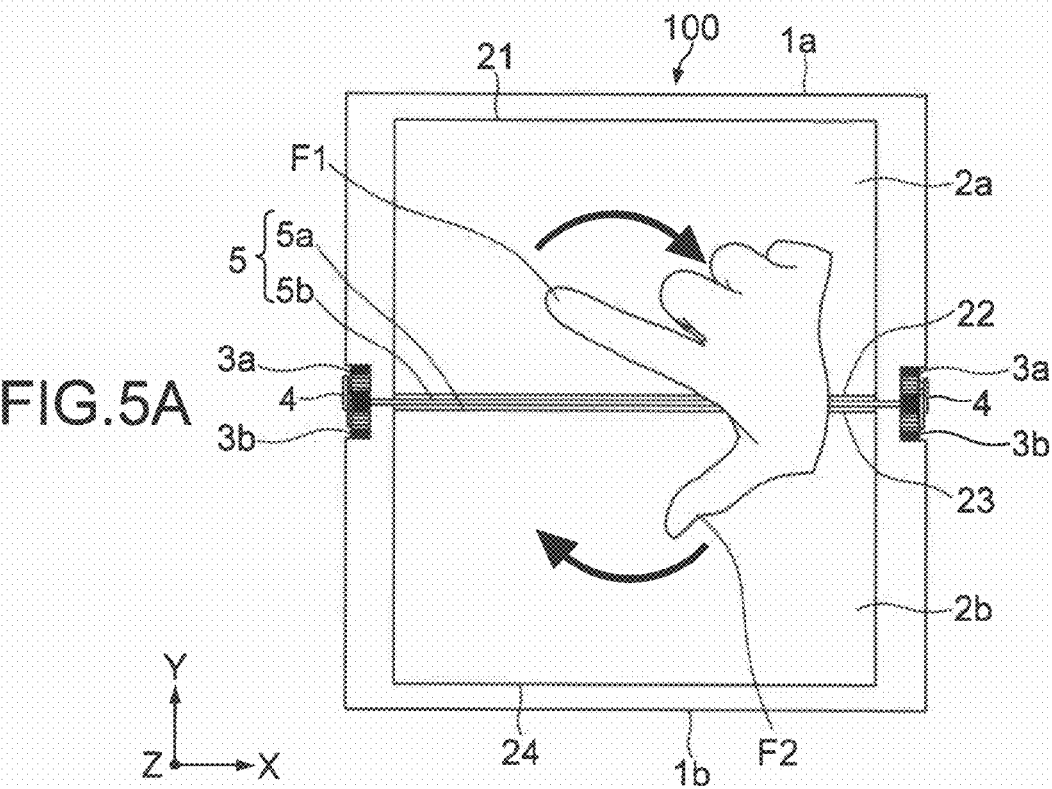
FIG. 5 are diagrams showing an example of a state of a rotation gesture in the portable information apparatus according to the embodiment of the present invention seen from a direction of a plane of a touch panel.
Figure 5B:
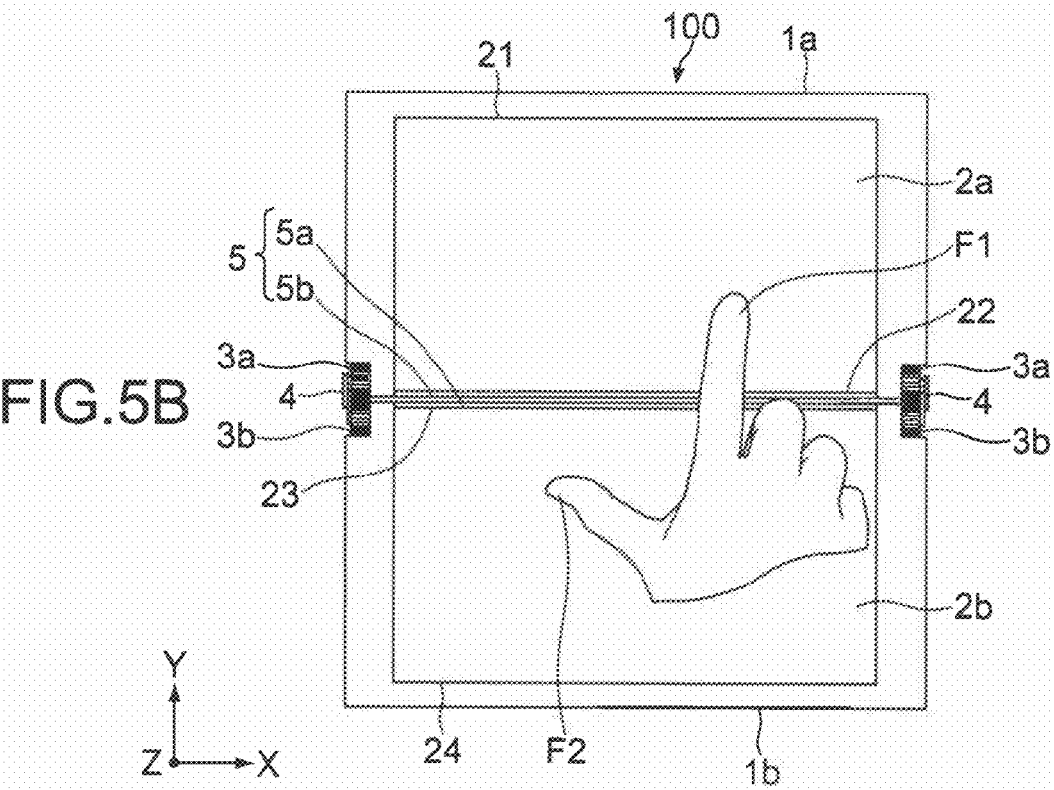

As shown in FIGS. 5A and 5B, the user touches the touch panels 2a and 2b with two fingers F1 and F2 (thumb and forefinger), respectively, and rotates the fingers in directions of arrows of the figures with the base portion of the fingers being as a fulcrum. In this case, the CPU 11 detects the touch operations in that rotation direction and also confirms that the hand is detected by the optical sensor 5.

Figure 6A:
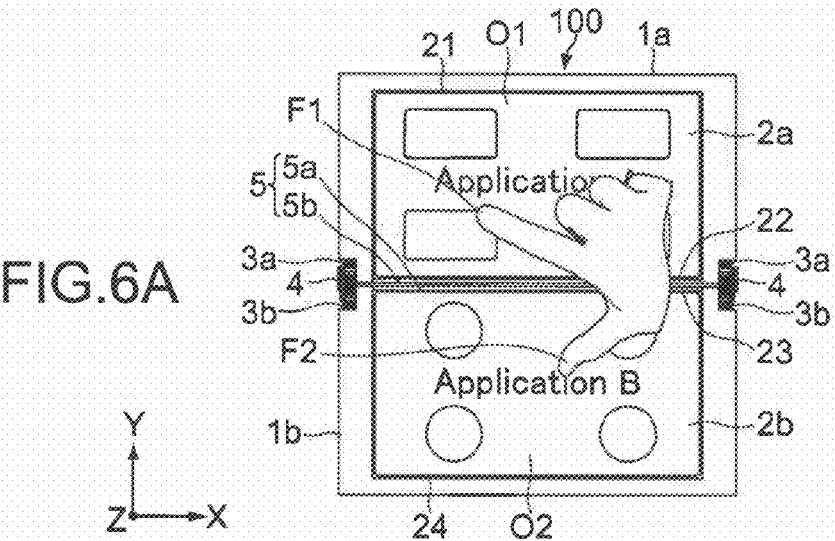
FIG. 6 are diagrams showing an example of specific display processing corresponding to the rotation gesture shown in FIG. 5.
Figure 6B:
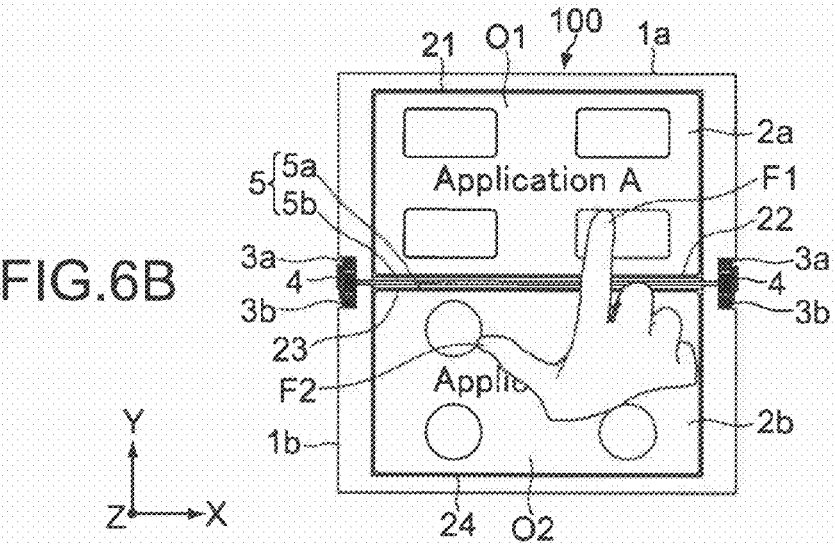
Figure 6C:
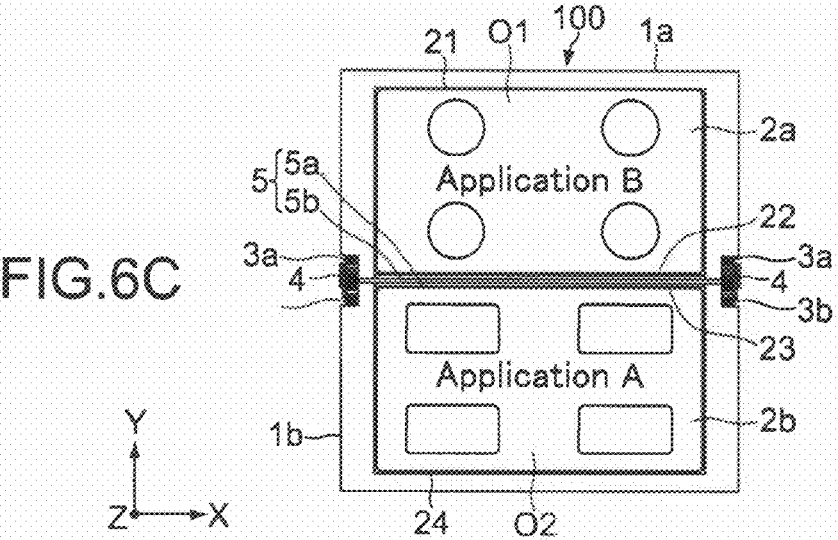

Referring back to FIG. 4, when detecting the rotation gesture, the CPU 11 executes display control (display change) processing corresponding to the rotation gesture (Step 46). FIG. 6 are diagrams showing an example of specific display control processing corresponding to the rotation gesture. FIGS. 6A and 6B show a state when the rotation gesture is input, and FIG. 6C shows a state after the rotation gesture is input.

As shown in FIG. 6A, as objects O1 and O2, for example, GUI screens of applications A and B that are being executed by the portable information apparatus 100 are displayed on the touch panels 2a and 2b. In this state, the user inputs the rotation gesture with the two fingers F1 and F2 as shown in FIGS. 6A and 6B. Then, the CPU 11 performs processing of changing the GUI screen of the application A and the GUI screen of the application B with each other between the touch panels 2a and 2b as shown in FIG. 6C.

In the figure, the CPU 11 executes the processing of changing the entire screens in accordance with the rotation gesture, but may change positions of other objects (images) such as windows and icons between the touch panels 2a and 2b.

Figure 7A:
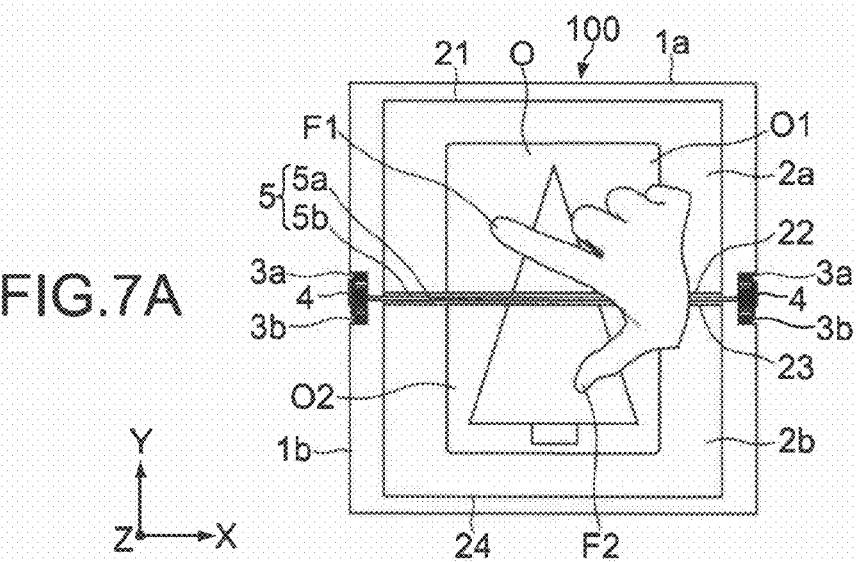
FIG. 7 are diagrams showing another example of the specific display processing corresponding to the rotation gesture shown in FIG. 5.
Figure 7B:
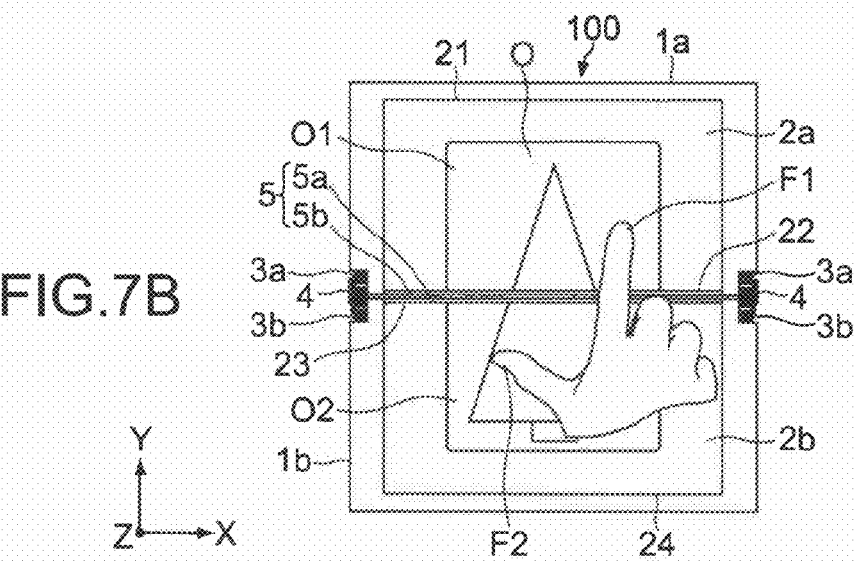
Figure 7C:
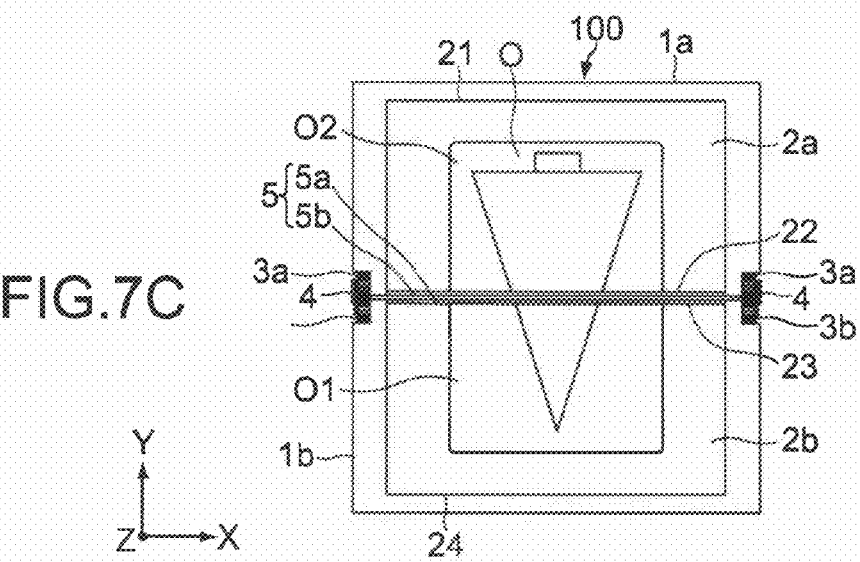

FIG. 7 are diagrams showing another example of the specific display control processing corresponding to the rotation gesture. FIGS. 7A and 7B show a state when the rotation gesture is input, and FIG. 7C shows a state after the rotation gesture is input.

As shown in FIG. 7A, an upper side portion O1 and a lower side portion O2 of one object O such as a picture are displayed on the touch panels 2a and 2b, respectively. In this state, the user inputs the rotation gesture described above with the two fingers F1 and F2 as shown in FIGS. 7A and 7B. Then, the CPU 11 rotates the object O 180 degrees with a Z axis of the figures being as a rotary axis, as shown in FIG. 7C.

The CPU 11 may rotate the object O not only by 180 degrees, but also by an angle corresponding to a rotation angle of the rotation gesture (movement amount of respective touch points).

Referring back to FIG. 4, when judging in Step 43 that the touch points do not rotate in the same rotation direction (NO), the CPU 11 judges whether the touch points linearly move in directions of moving close to each other (Step 47). When judging that the touch points linearly move in the directions of moving close to each other (YES), the CPU 11 judges whether the optical sensor 5 detects a thing (hand) within the predetermined distance range (Step 48). In a case where a thing (hand) is not detected within the predetermined distance range (NO), the CPU 11 judges the detected touch operations are a false detection, and ends the link display control processing of objects.

In a case where a thing (hand) is detected within the predetermined distance range (YES), the CPU 11 judges that the touch operations are a pinch gesture (Step 49).

Figure 8A:
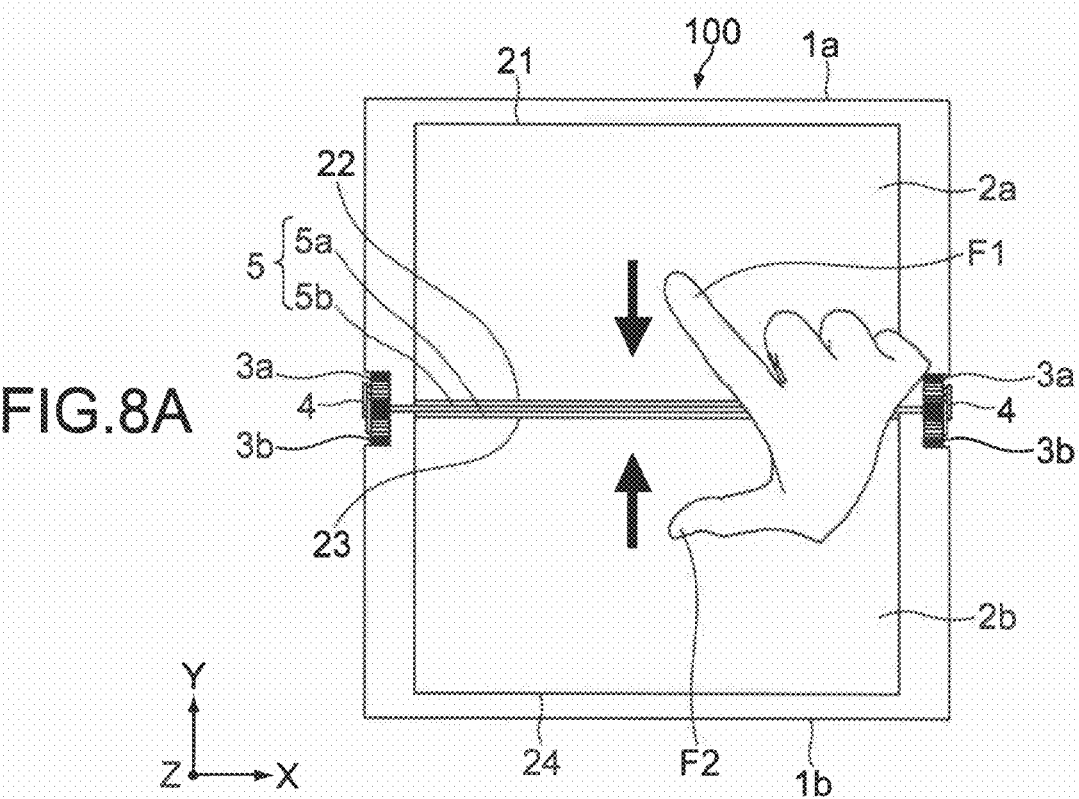
FIG. 8 are diagrams showing an example of a state of a pinch gesture in the portable information apparatus according to the embodiment of the present invention seen from the direction of the plane of the touch panel.
Figure 8B:
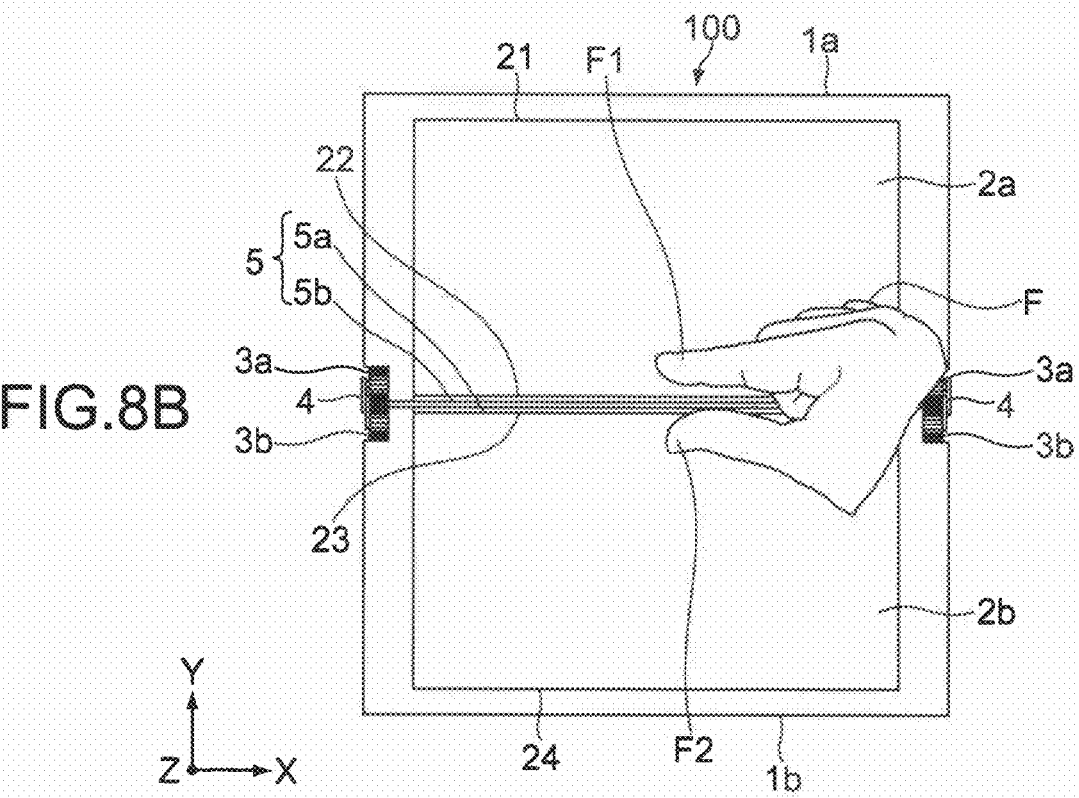

FIG. 8 are diagrams showing an example of a state of the pinch gesture seen from the direction of the plane of the touch panels 2a and 2b.

As shown in FIGS. 8A and 83, the user touches the touch panels 2a and 2b with the two fingers F1 and F2 (thumb and forefinger), respectively, and linearly moves the fingers in opposite directions in which touch points of both the fingers F1 and F2 move close to each other (directions of arrows in figure). That is, the user performs a touch gesture like pinching something with the two fingers F1 and F2 or bringing together the two fingers F1 and F2. In this case, the CPU 11 detects the touch operations in the linear and opposite directions in which the touch points move close to each other and confirms that the hand is detected by the optical sensor 5.

Referring back to FIG. 4, when detecting the pinch gesture, the CPU 11 executes display control (display change) processing corresponding to the pinch gesture (Step 50). FIG. 9 are diagrams showing an example of specific display control processing corresponding to the pinch gesture. FIGS. 9A and 9B show a state when the pinch gesture is input, and FIG. 9C shows a state after the pinch gesture is input.

As shown in FIG. 9A, an object O1 such as a picture of landscape (background) is displayed on the touch panel 2a, and an object O2 such as a picture of persons is displayed on the touch panel 2b. In this state, the user inputs the pinch gesture described above with the two fingers F1 and F2 as shown in FIGS. 9A and 9B. Then, the CPU 11 moves the objects O1 and O2 to the optical sensor 5 side as shown in FIG. 9B. Further, for example, when a distance between both the objects O1 and O2 (distance between both touch points) is equal to or smaller than a predetermined distance, the CPU 11 combines the object O1 and the object O2 and displays them as shown in FIG. 9C. That is, the CPU 11 combines the object O2 as a picture of persons with the object O1 as a picture of landscape on the object O1, and generates and displays an object O3 as a new picture on the touch panel 2a (or touch panel 2b).

Other than the combining processing as described above, various types of processing are assumed as the display control processing corresponding to the pinch gesture. For example, the CPU 11 may execute display control in which slime-like or cell-like objects displayed on the touch panels 2a and 2b are united into one in accordance with the pinch gesture. Such display control can be applied to a game application or the like.

Further, in accordance with a pinch gesture with respect to two objects such as pictures, the CPU 11 may execute processing in which both the objects are stored as one piece of album data in the flash memory 13 or the like.

Referring back to FIG. 4, when judging in Step 47 that the touch points do not linearly move in the directions of moving close to each other (NO), the CPU 11 judges whether the touch points linearly move in directions of moving away from each other (Step 51).

When judging that the touch points do not linearly move in the directions of moving away from each other (NO), the CPU 11 judges that a detectable gesture is not input and ends the link display control processing of objects.

When judging that the touch points linearly move in the directions of moving away from each other (YES), the CPU 11 judges whether the optical sensor 5 detects a thing (hand) within the predetermined distance range (Step 52).

In a case where a thing (hand) is detected within the predetermined distance range (YES), the CPU 11 judges that the touch operations are a zoom-in gesture (Step 53).

FIG. 10 are diagrams showing an example of a state of the zoom-in gesture seen from the direction of the plane of the touch panels 2a and 2b.

As shown in FIGS. 10A and 10B, the user touches the touch panels 2a and 2b with the two fingers F1 and F2 (thumb and forefinger), respectively, and linearly moves the fingers in opposite directions in which the touch points of both the fingers F1 and F2 move away from each other (directions of arrows in figure).

That gesture is a gesture in opposite direction of the pinch gesture. In this case, the CPU 11 detects the touch operations in the linear and opposite directions in which the touch points move away from each other, and confirms that the hand is detected by the optical sensor 5.

Figure 11A:
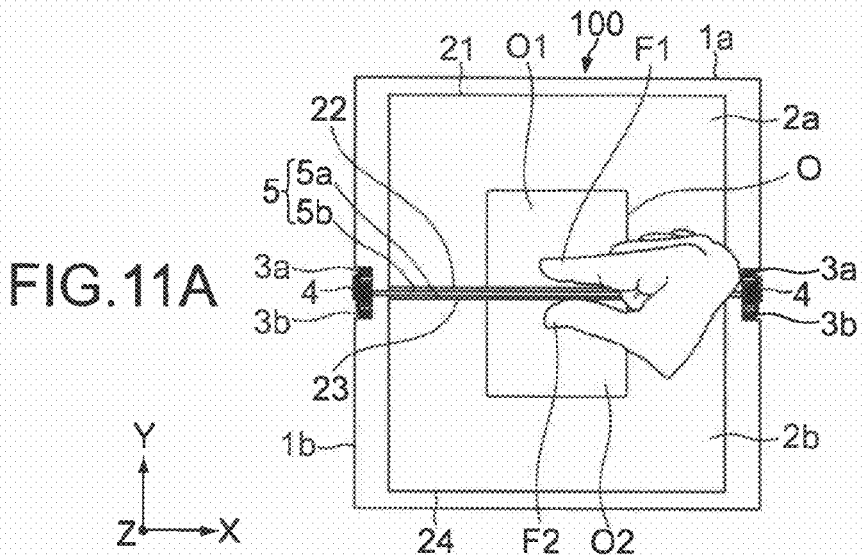
FIG. 11 are diagrams showing an example of the specific display processing corresponding to the zoom-in gesture shown in FIG. 10.
Figure 11B:
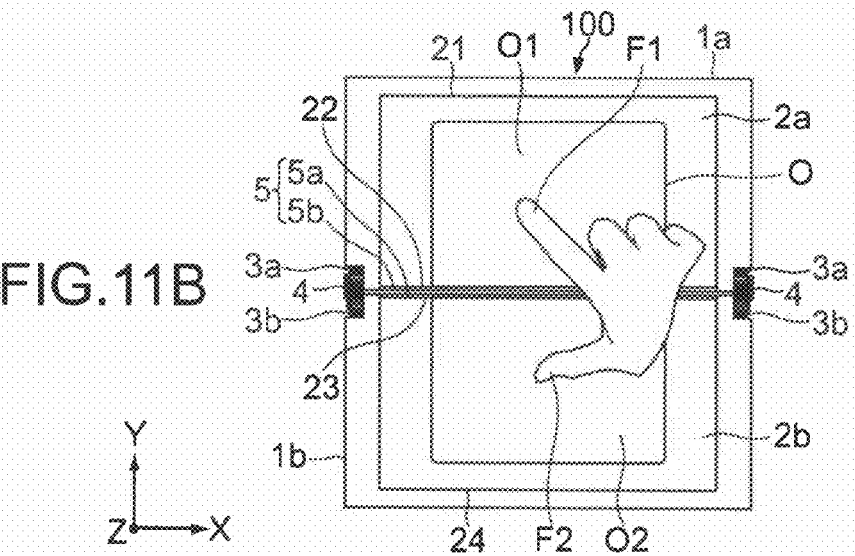
Figure 11C:
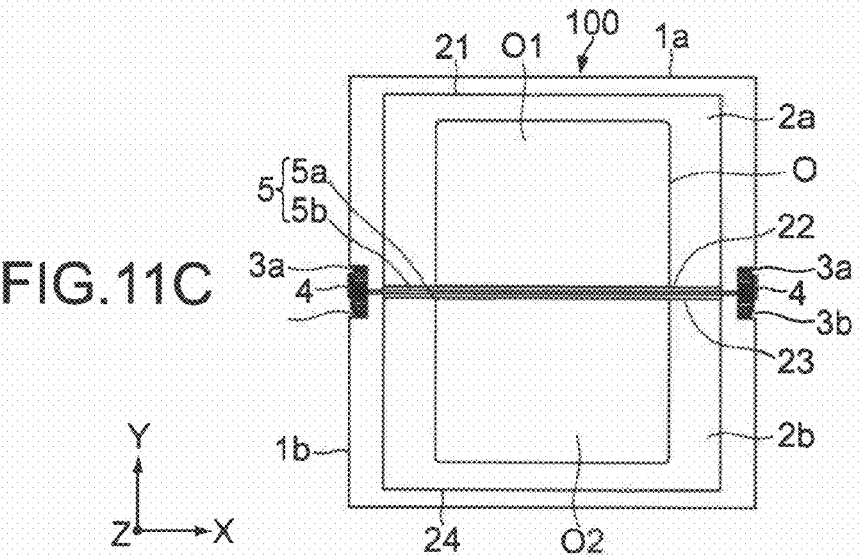

Referring back to FIG. 4, when detecting the zoom-in gesture, the CPU 11 executes display control (display change) processing corresponding to the zoom-in gesture (Step 53). FIG. 11 are diagrams showing an example of specific display control processing corresponding to the zoom-in gesture. FIGS. 11A and 11B show a state when the zoom-in gesture is input, and FIG. 11C shows a state after the zoom-in gesture is input.

As shown in FIG. 11A, an upper side portion O1 and a lower side portion O2 of one object O such as a picture and a window are displayed on the touch panels 2a and 2b, respectively. In this state, the user inputs the zoom-in gesture described above with the two fingers F1 and F2 as shown in FIGS. 11A and 11B. Then, the CPU 11 zooms in the object O as shown in FIG. 11C. That is, the CPU 11 displays the zoomed-in object O as the objects O1 and O2 on the touch panels 2a and 2b, respectively.

Referring back to FIG. 4, in a case where a thing (hand) is not detected within the predetermined distance range in step 52 (NO), the CPU 11 judges that the touch operations are a tear gesture (Step 55).

FIG. 12 are diagrams showing an example of a state of the tear gesture seen from the direction of the plane of the touch panels 2a and 2b.

As shown in FIGS. 12A and 12B, the user touches the touch panels 2a and 2b with a finger F1 of one hand and a finger F2 of the other hand (forefingers), respectively, and linearly moves the fingers in opposite directions in which the touch points of both the fingers F1 and F2 move away from each other (directions of arrows in figure).

The touch operations are similar to a movement of a case where a user tears an actual document. Here, the movement direction of the touch operations is the same as the zoom-in gesture described above. Accordingly, the user performs the touch operations so that both the fingers F1 and F2 or both the hands are not positioned above the optical sensor 5. That is, even in the touch operations in the same direction, the zoom-in gesture and the tear gesture are differentiated from each other based on the presence of the detection by the optical sensor 5. The CPU 11 detects the touch operations in the linear and opposite directions in which the touch points move away from each other, and confirms that the hand is not detected by the optical sensor 5.

Figure 13A:
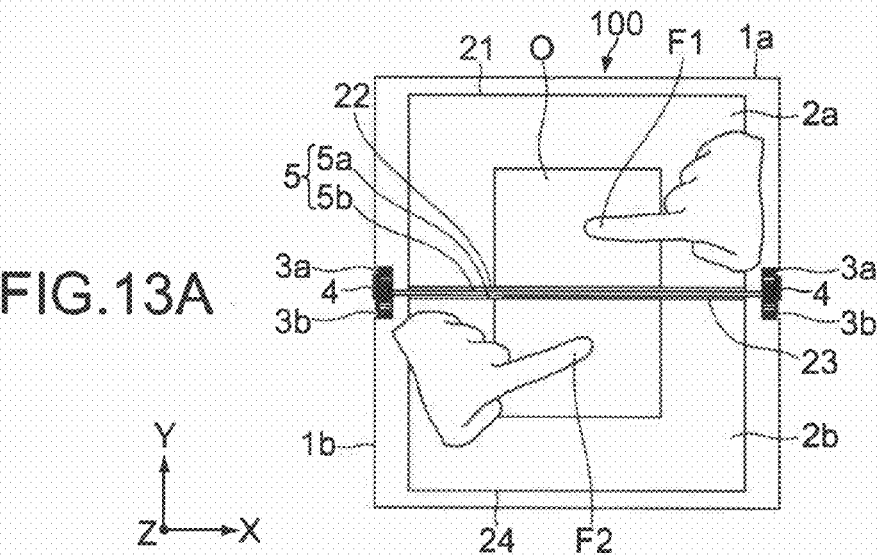
FIG. 13 are diagrams showing an example of the specific display processing corresponding to the tear gesture shown in FIG. 12.
Figure 13B:
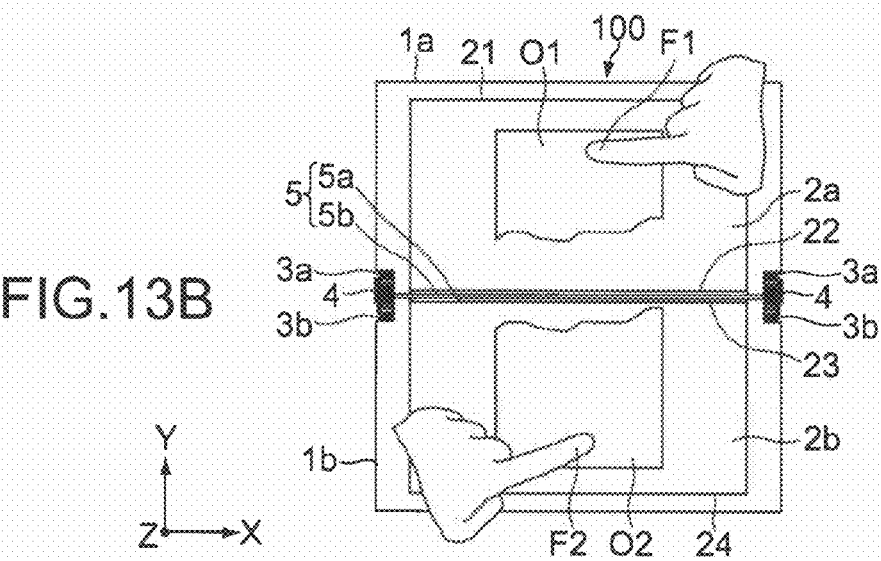

Referring back to FIG. 4, when detecting the tear gesture, the CPU 11 executes display control (display change) processing corresponding to the tear gesture (Step 56). FIG. 13 are diagrams showing an example of specific display control processing corresponding to the tear gesture. FIGS. 13A and 13B show a state when the tear gesture is input, and FIG. 13C shows a state after the tear gesture is input.

As shown in FIG. 13A, an upper side portion O1 and a lower side portion O2 of one object O such as a document file are displayed on the touch panels 2a and 2b, respectively. In this state, the user inputs the tear gesture described above with the two fingers F1 and F2 as shown in FIGS. 13A and 13B. Then, the CPU 11 changes the object O so that the object O is torn into a piece O1 and the other piece O2 as shown in FIG. 13B.

Figure 13C:
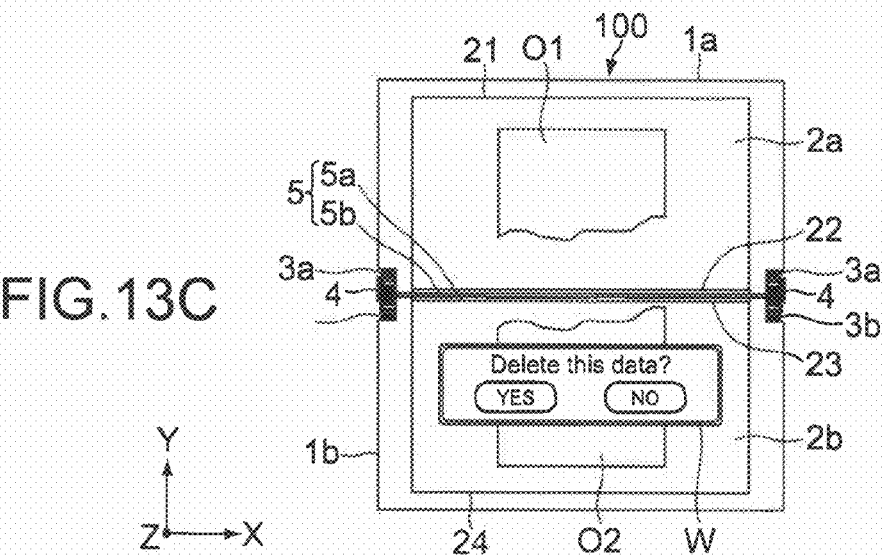

Further, as shown in FIG. 13C, the CPU 11 may display a pop-up window W for confirming whether data corresponding to the object O is deleted from the flash memory 13 or the like with the user. In this case, the user selects whether the data is deleted or not by a touch operation on the pop-up window W. The CPU 11 executes processing corresponding to that selection.

Referring back to FIG. 4, when judging in Step 42 that the touch operations are not detected at the same time (NO), the CPU 11 judges whether a detection time difference between the touch operations to the touch panels 2a and 2b is within a predetermined time period (Step 57).

That is, the CPU 11 judges whether a touch operation to the touch panel 2b (2a) is detected within a predetermined time period since a touch operation to the touch panel 2a (2b) has been detected. Here, the predetermined time period is, for example, about 3 seconds, but is not limited thereto.

When judging that the detection time difference does not fall within the predetermined time period (NO), the CPU 11 ends the link display control processing of objects.

When judging that the detection time difference is within the predetermined time period (YES), the CPU 11 judges whether both the touch points each draw a circle in the same rotation direction (Step 58). When judging that both the touch points do not each draw a circle in the same rotation direction (NO), the CPU 11 ends the link display control processing of objects.

When judging that both the touch points each draw a circle in the same rotation direction (YES), the CPU 11 judges that the touch operations are a grouping gesture (Step 59).

Figure 14A:
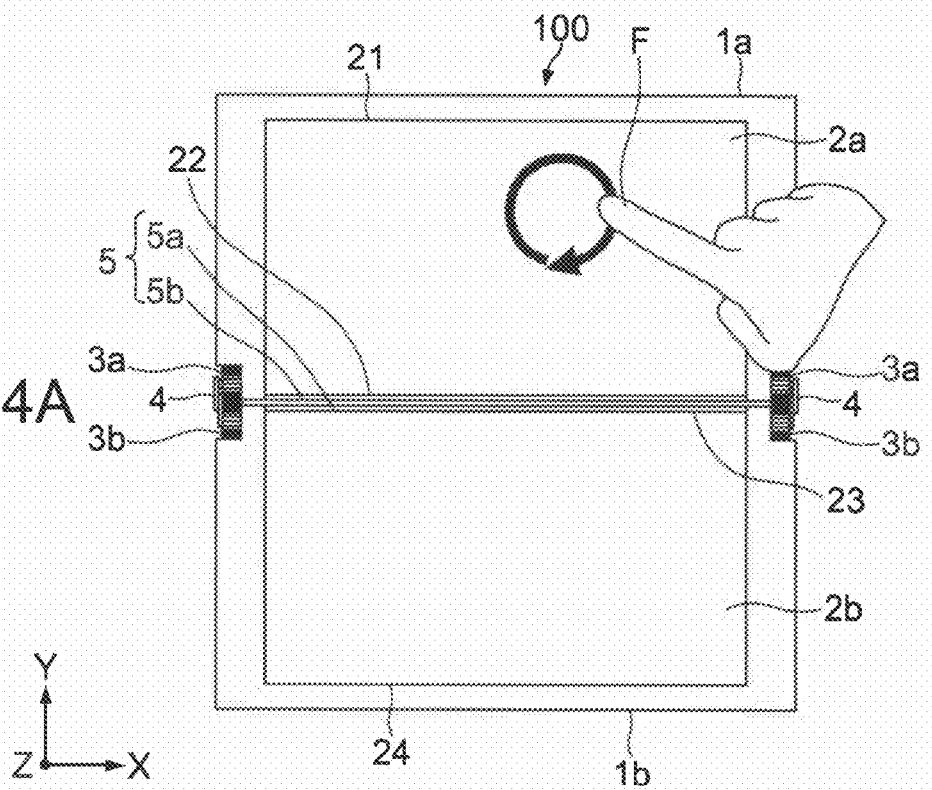
FIG. 14 are diagrams showing an example of a state of a grouping gesture in the portable information apparatus according to the embodiment of the present invention seen from the direction of the plane of the touch panel.
Figure 14B:
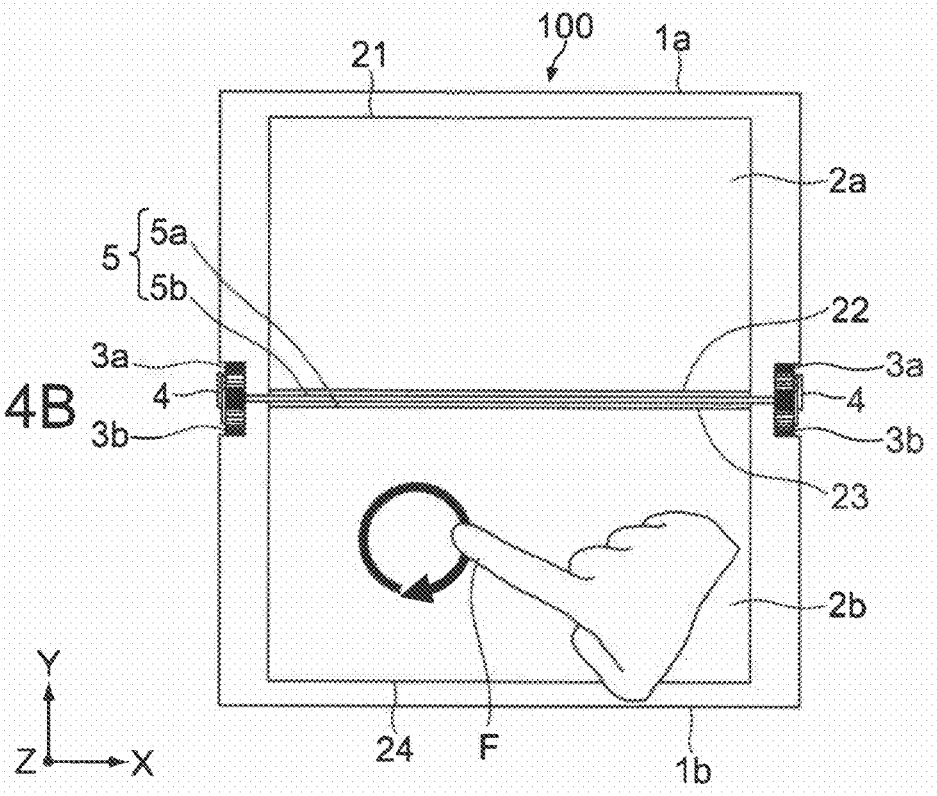

FIG. 14 are diagrams showing an example of a state of the grouping gesture seen from the direction of the plane of the touch panels 2a and 2b.

As shown in FIG. 14A, the user first touches the touch panel 2a with a finger F (forefinger) of one hand and move the finger F so as to draw a circle in a predetermined direction such as a clockwise direction. Subsequently, within the predetermined time period, the user touches the touch panel 2b with the finger F and moves the finger F so as to draw a circle in the same direction as the movement direction on the touch panel 2a. The CPU 11 detects the series of touch operations like drawing circles as a grouping gesture.

Figure 15A:
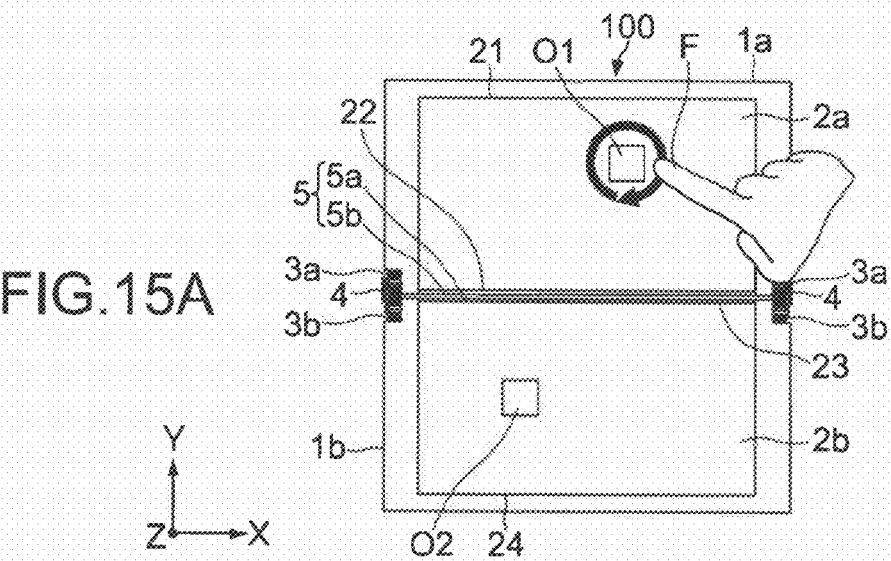
FIG. 15 are diagrams showing an example of the specific display processing corresponding to the grouping gesture shown in FIG. 14.
Figure 15B:
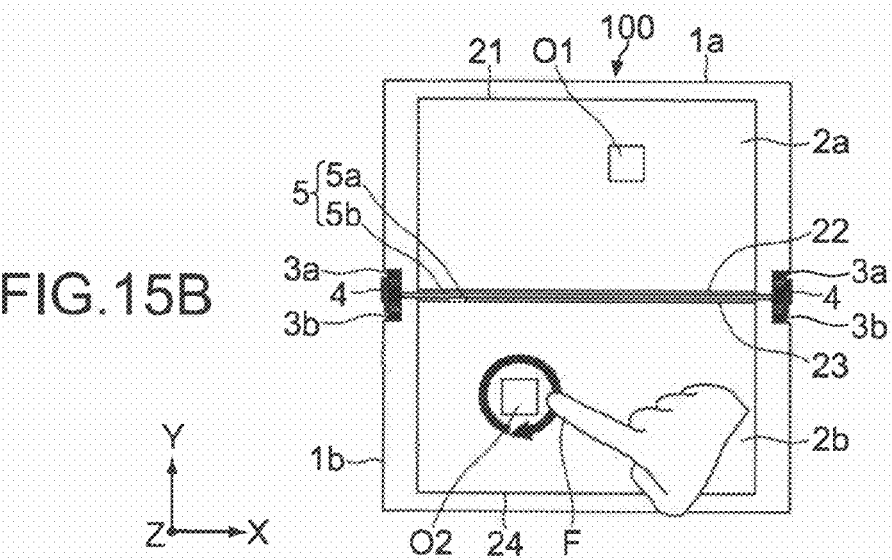
Figure 15C:
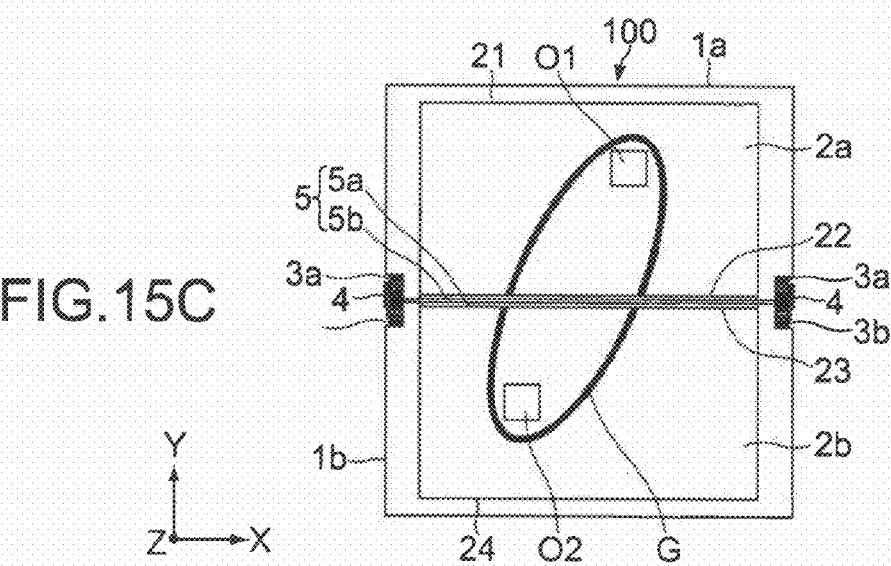

Referring back to FIG. 4, when detecting the grouping gesture, the CPU 11 executes display control (display change) processing corresponding to the grouping gesture (Step 60). FIG. 15 are diagrams showing an example of specific display control processing corresponding to the grouping gesture. FIGS. 15A and 15B show a state when the grouping gesture is input, and FIG. 15C shows a state after the grouping gesture is input.

As shown in FIG. 15A, objects O1 and O2 such as icons of file are displayed on the touch panels 2a and 2b, respectively. In this state, the user inputs the grouping gesture described above with the finger F within the predetermined time period as shown in FIGS. 15A and 15B. Then, the CPU 11 displays a group frame G enclosing the objects O1 and O2 as shown in FIG. 15C.

Further, the CPU 11 groups data corresponding to the objects O1 and O2 (icons of file) enclosed by the group frame G and stores it in the flash memory 13 or the like.

Moreover, in this case, the CPU 11 may display, on the touch panel 2a or 2b, a text or an image indicating that the grouping processing has been executed. For example, the CPU 11 displays the text or the image on the touch panel 2b on which the object O2 secondly enclosed is displayed. The text or the image may of course be displayed on the touch panel 2a.

The objects O1 and O2 may not be an icon but be a file of pictures or documents, and an area thereof may be any size as long as it is smaller than the touch surfaces of the touch panels 2a and 2b.

In addition to the case where two objects are enclosed, even in a case where touch operations in which three objects or more are continuously enclosed are detected, the CPU 11 can similarly group those objects.

With the above processing, the link display control processing of objects is ended.

(Uses of Two Touch Panels)

As uses of the two touch panels 2a and 2b in this embodiment, various uses are assumed.

For example, as described above, the two touch panels 2a and 2b may be used as a single screen. In this case, one object is displayed across both the touch panels 2a and 2b and single, integrated processing corresponding to touch operations to the touch panels 2a and 2b is executed.

Further, one touch panel 2a (2b) may be used on a cloud side and the other touch panel 2b (2a) may be used on a client side.

On the cloud side, an image downloaded from a computer of a cloud service provider on the network, connected via the communication portion 14, is displayed. On the client side, an image of a file or the like stored in the portable information apparatus 100 is displayed.

By inputting the various touch gestures described above with respect to respective objects on the cloud side and the client side, the user can cause the portable information apparatus 100 to execute processing such as a switch of display positions of the objects, combination, and grouping.

Moreover, the two touch panels 2a and 2b may be used for tasks in multitasking.

In this case, by mutually inputting the various touch gestures described above with respect to the respective objects between the touch panels 2a and 2b, the user can switch a display position of task screens or integrate the respective tasks into one task.

(Summary of this Embodiment)

As described above, according to this embodiment, the portable information apparatus 100 can link and change display of respective objects to be a target of a touch gesture, in accordance with touch operations (touch gestures) to the two touch panels 2a and 2b.

Accordingly, since the portable information apparatus 100 can process a plurality of objects not only individually but also integrally as compared to a case where a single touch panel is used, it is possible to increase flexibility of processing in accordance with uses by a user.

Further, since the touch gestures are similar to an operation of rotating an actual object or document, a pinching operation, a widening operation, a tearing operation, and the like, the user can intuitively execute the display control processing corresponding to the respective gestures.

MODIFIED EXAMPLES

The present invention is not limited to only the embodiment described above and can be variously modified without departing from the gist of the present invention.

In the embodiment described above, as shown in FIGS. 12 and 13, the example in which a gesture as the tearing gesture in a vertical direction in the figures (Y direction) has been described. However, the tearing gesture may be in a horizontal direction (X direction) or oblique direction.

In a case where the tearing gesture is made in the horizontal direction, there may be a case where the gesture direction is similar to that of the rotation gesture shown in FIGS. 5 and 6, though a difference between linear one and curved one is present. However, by confirming the presence of the detection made by the optical sensor 5, the CPU 11 can differentiate both the gestures reliably and prevent false detection.

In the embodiment described above, the portable information apparatus 100 detects all the touch gestures of rotation, combination, zoom-in, tear, and grouping, and executes the display control (display change) processing corresponding to those gestures. However, the portable information apparatus 100 only needs to be capable of detecting at least one of those gestures and executing display control processing corresponding thereto.

In the embodiment described above, the example in which the two touch panels 2a and 2b are provided to the portable information apparatus 100 has been described. However, the number of touch panels is not limited to two as long as it is plural, and the same processing as that described above can be executed between the touch panels.

In the embodiment described above, the touch operations to the touch panels 2a and 2b are input with a finger of a user, but may be input using a tool such as a stylus pen.

Examples of the portable information apparatus 100 to which the present invention can be applied in the embodiment include various information processing apparatuses such as a cellular phone, a PDA, a smartphone, a portable music/video player, an electronic dictionary, and an electronic organizer.

Moreover, the present invention is not limited to a portable information apparatus and is similarly applicable to various stationary information processing apparatuses.

The present application contains subject matter related to that disclosed in Japanese Priority Patent Application JP 2009-097724 filed in the Japan Patent Office on Apr. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a first touch panel that displays a first object and detects a first touch operation of a user on the first object on a first area of the first touch panel;
   a second touch panel that displays a second object and detects a second touch operation of the user on the second object on a second area of the second touch panel, wherein each of the first object and the second object is displayed at a same time as part of a third object;
   a sensor disposed between the first touch panel and the second touch panel that detects an item that is present within a predetermined distance range above the sensor; and
   a controller that, when the second touch operation and the first touch operation are detected within a predetermined time period of each other, determines that a user is performing the touch operations with two fingers of a same hand across the two panels on the first area of the first touch panel and the second area of the second touch panel when the item is detected by the sensor, and determines that the user is performing the touch operations with a finger of one hand on the first area of the first touch panel and a finger of another hand on the second area of the second touch panel when the item is not detected by the sensor.

2. The information processing apparatus according to claim 1,
   wherein the controller displays the first object on the second touch panel and displays the second object on the first touch panel when the second touch operation is detected within the predetermined time period since the first touch operation has been detected.

3. The information processing apparatus according to claim 1,
   wherein each of the first touch operation and the second touch operation is an operation in a rotation direction, and
   wherein the controller rotates the third object when the second touch operation is detected within the predetermined time period since the first touch operation has been detected and the item is detected by the sensor.

4. The information processing apparatus according to claim 1,
   wherein the controller changes the third object so that the third object is torn when the second touch operation is detected within the predetermined time period since the first touch operation has been detected and the item is not detected by the sensor.

5. The information processing apparatus according to claim 4, further comprising
a storage that stores data corresponding to the third object,
wherein the controller deletes the data from the storage when the third object is changed so that the third object is torn.

6. The information processing apparatus according to claim 1,
wherein the first touch operation and the second touch operation are operations in directions moving close to each other, and
wherein the controller changes the first object and the second object so that the first object and the second object are integrated into one when the second touch operation is detected within the predetermined time period since the first touch operation has been detected.

7. The information processing apparatus according to claim 1,
wherein the controller changes the displayed first object and the displayed second object in a first mode when the item is detected by the sensor, and changes the displayed first object and the displayed second object in a second mode that is different from the first mode, when the item is not detected by the sensor.

8. The information processing apparatus according to claim 1, further comprising
a storage that stores first data corresponding to the first object and second data corresponding to the second object,
wherein the first touch operation is an operation of enclosing the first object in a predetermined rotation direction,
wherein the second touch operation is the operation of enclosing the second object in the predetermined rotation direction, and
wherein the controller causes the storage to group and store the first data and the second data when the second touch operation is detected within the predetermined time period since the first touch operation has been detected.

9. An information processing method, comprising:
displaying, by a first touch panel, a first object and detecting a first touch operation of a user on the first object on a first area of the first touch panel;
displaying, by a second touch panel, a second object and detecting a second touch operation of the user on the second object on a second area of the second touch panel, wherein each of the first object and the second object is displayed at a same time as part of a third object;
detecting, by a sensor disposed between the first touch panel and the second touch panel, when an item is present within a predetermined distance range above the sensor; and
when the second touch operation and the first touch operation are detected within a predetermined time period of each other, determining that a user is performing the touch operations with two fingers of a same hand across the two panels on the first area of the first touch panel and the second area of the second touch panel when the item is detected by the sensor, and determining that the user is performing the touch operations with a finger of one hand on the first area of the first touch panel and a finger of another hand on the second area of the second touch panel when the item is not detected by the sensor.

10. A non-transitory computer readable storage medium storing a program that causes an information processing apparatus including a first touch panel and a second touch panel to execute:
displaying, by a first touch panel, a first object and detecting a first touch operation of a user on the first object on a first area of the first touch panel;
displaying, by a second touch panel, a second object and detecting a second touch operation of the user on the second object on a second area of the second touch panel, wherein each of the first object and the second object is displayed at a same time as part of a third object;
detecting, by a sensor disposed between the first touch panel and the second touch panel, when an item is present within a predetermined distance range above the sensor; and
when the second touch operation and the first touch operation are detected within a predetermined time period of each other, determining that a user is performing the touch operations with two fingers of a same hand across the two panels on the first area of the first touch panel and the second area of the second touch panel when the item is detected by the sensor, and determining that the user is performing the touch operations with a finger of one hand on the first area of the first touch panel and a finger of another hand on the second area of the second touch panel when the item is not detected by the sensor.

11. The information processing apparatus according to claim 1, wherein the predetermined time period is 0.5 seconds.

12. The information processing apparatus according to claim 1, wherein the controller enlarges the third object to be displayed when the first touch operation and the second touch operation are detected within the predetermined time range, the first touch operation and the second touch operation are operations in opposite directions, and the item is detected by the sensor.

13. The information processing apparatus according to claim 1, wherein sensor is an optical sensor.

14. information processing apparatus according to claim 1, wherein the controller performs a first action on the displayed first object and the displayed second object when the controller determines that the user is performing the touch operations with two fingers of a same hand across the two panels on the first area of the first touch panel and the second area of the second touch panel, and the controller performs a second action, different from the first action, on the displayed first object and the displayed second object when the controller determines that the user is performing the touch operations with a finger of one hand on the first area of the first touch panel and a finger of another hand on the second area of the second touch panel.

* * * * *